US012513701B2

(12) United States Patent
Ji et al.

(10) Patent No.: US 12,513,701 B2
(45) Date of Patent: Dec. 30, 2025

(54) CONTROL INFORMATION FOR COOPERATIVE COMMUNICATION

(71) Applicant: Samsung Electronics Co., Ltd., Gyeonggi-do (KR)

(72) Inventors: Hyoungju Ji, Gyeonggi-do (KR); Hoondong Noh, Gyeonggi-do (KR); Jinhyun Park, Gyeonggi-do (KR); Youngrok Jang, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 402 days.

(21) Appl. No.: 17/796,101

(22) PCT Filed: Feb. 10, 2021

(86) PCT No.: PCT/KR2021/001828
§ 371 (c)(1),
(2) Date: Jul. 28, 2022

(87) PCT Pub. No.: WO2021/162474
PCT Pub. Date: Aug. 19, 2021

(65) Prior Publication Data
US 2023/0126574 A1 Apr. 27, 2023

(30) Foreign Application Priority Data
Feb. 13, 2020 (KR) ........................ 10-2020-0017949

(51) Int. Cl.
*H04W 72/23* (2023.01)
*H04W 72/044* (2023.01)
*H04W 72/1273* (2023.01)

(52) U.S. Cl.
CPC ......... *H04W 72/23* (2023.01); *H04W 72/046* (2013.01); *H04W 72/1273* (2013.01)

(58) Field of Classification Search
None
See application file for complete search history.

(56) References Cited

U.S. PATENT DOCUMENTS

| 12,279,272 B2 * | 4/2025 | Schober ............... H04B 7/0408 |
| 2019/0081750 A1 | 3/2019 | Yang et al. |

(Continued)

FOREIGN PATENT DOCUMENTS

| CN | 110073609 | 7/2019 |
| CN | 110581752 | 12/2019 |

(Continued)

OTHER PUBLICATIONS

Manu Saini, 5G NR (CORESET, Search Space and BWP), May 12, 2019, p. 1-8.*

(Continued)

*Primary Examiner* — Ayman A Abaza
*Assistant Examiner* — Camquyen Thai
(74) *Attorney, Agent, or Firm* — The Farrell Law Firm, P.C.

(57) ABSTRACT

The present disclosure relates to a communication technique that merges IoT technology with a 5G communication system for supporting higher data transmission rates than 4G systems, and a system therefor. The present disclosure may be applied to intelligent services (for example, smart homes, smart buildings, smart cities, smart cars or connected cars, healthcare, digital education, retail business, security and safety-related services, etc.) on the basis of 5G communication technology and IoT-related technology. The present disclosure discloses a method for improving the reliability of a control channel in a wireless communication system. Specifically, a method for a base station in a wireless communication system is characterized in that: control channel configuration information including a plurality of pieces of transmission configuration indicator (TCI) information is transmitted to a terminal; downlink control information for scheduling downlink data is transmitted to the terminal on a plurality of downlink control channels according to a plu- (Continued)

rality of TCIs; and the downlink data is transmitted to the terminal.

12 Claims, 22 Drawing Sheets

(56) References Cited

U.S. PATENT DOCUMENTS

| | | | |
|---|---|---|---|
| 2019/0089498 A1* | 3/2019 | Pelletier | H04L 5/005 |
| 2019/0103908 A1 | 4/2019 | Yu et al. | |
| 2019/0159215 A1 | 5/2019 | Su et al. | |
| 2019/0260524 A1* | 8/2019 | Nam | H04L 1/0045 |
| 2019/0297603 A1* | 9/2019 | Guo | H04L 5/0053 |
| 2019/0319767 A1 | 10/2019 | Sun et al. | |
| 2019/0335492 A1 | 10/2019 | Venugopal et al. | |
| 2019/0342035 A1 | 11/2019 | Zhang et al. | |
| 2019/0364579 A1 | 11/2019 | Zhang et al. | |
| 2019/0379506 A1 | 12/2019 | Cheng | |
| 2019/0379561 A1 | 12/2019 | Zhang et al. | |
| 2019/0394793 A1 | 12/2019 | Yenugopal et al. | |
| 2020/0028652 A1 | 1/2020 | Bai et al. | |
| 2020/0045700 A1 | 2/2020 | Sun et al. | |
| 2021/0195600 A1* | 6/2021 | Khoshnevisan | H04W 72/53 |
| 2021/0235452 A1 | 7/2021 | Huang | |
| 2023/0007519 A1* | 1/2023 | Bagheri | H04W 72/0446 |
| 2025/0070942 A1* | 2/2025 | Cirik | H04L 5/0023 |

FOREIGN PATENT DOCUMENTS

| | | |
|---|---|---|
| WO | WO 2018/232090 | 12/2018 |
| WO | WO 2019/244218 | 12/2019 |
| WO | WO 2019/244223 | 12/2019 |

OTHER PUBLICATIONS

PCT/ISA/210 Search Report issued on PCT/KR2021/001828, May 28, 2021 pp. 5.
PCT/ISA/237 Written Opinion issued on PCT/KR2021/001828, May 28, 2021, pp. 5.
3GPP; TSG RAN; NR; Physical layer procedures for control (Release 16), 3GPP TS 38.213 V16.0.0, Jan. 14, 2020, pp. 148.
3GPP; TSG RAN; NR; Physical layer procedures for data (Release 16), 3GPP TS 38.214 V16.0.0, Jan. 14, 2020, pp. 149.
Huawei et al., "Enhancements on multi-beam operation", R1-1908067, 3GPP TSG RAN WG1 Meeting #9 8, Prague, Czech Republic, Aug. 17, 2019, pp. 22.
Chinese Office Action dated Jul. 16, 2024 issued in counterpart application No. 202180014750.2, 19 pages.
Chinese Office Action dated Dec. 30, 2025 issued in counterpart application No. 202180014750.2, 18 pages.
Chinese Office Action dated Mar. 31, 2025 issued in counterpart application No. 202180014750.2, 19 pages.
Huawei et al., "Enhancements on Multi-TRP/Panel Transmission", R1-1903970, 3GPP TSG RAN WG1 Meeting #96bis, Apr. 8-12, 2019, 20 pages.
Korean Office Action dated Jun. 29, 2025 issued in counterpart application No. 10-2020-0017949, 9 pages.

* cited by examiner

TCI state #0 (700)   TCI state #1 (705)   TCI state #2 (710)

CONTROL INFORMATION FOR COOPERATIVE COMMUNICATION

PRIORITY

This application is a National Phase Entry of PCT International Application No. PCT/KR2021/001828, which was filed on Feb. 10, 2021, and claims priority to Korean Patent Application No. 10-2020-0017949, which was filed on Feb. 13, 2020, the entire content of each of which is incorporated herein by reference.

TECHNICAL FIELD

The disclosure relates to a method and a device for transmitting a downlink control channel in a wireless communication system for cooperative communication.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "beyond 4G Network" communication system or a "post LTE" system. The 5G communication system is considered to be implemented in ultrahigh frequency (mmWave) bands (e.g., 60 GHz bands) so as to accomplish higher data rates. To decrease propagation loss of the radio waves and increase the transmission distance in the ultrahigh frequency bands, beamforming, massive multiple-input multiple-output (massive MIMO), full dimensional MIMO (FD-MIMO), array antenna, analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (COMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology (IT) services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (cloud RAN) as the above-described big data processing technology may also be considered an example of convergence of the 5G technology with the IoT technology.

With the advance of wireless communication systems and the description above, various services can be provided, and accordingly there is a need for schemes to smoothly provide these services.

DISCLOSURE OF INVENTION

Technical Problem

An objective of the disclosure is to provide a device and a method capable of efficiently providing a service in a mobile communication system.

Solution to Problem

A method of a base station in a wireless communication system according to an embodiment of the disclosure to achieve the objective includes, in order to receive a downlink control channel (PDCCH), receiving a configuration of one or more transmission configuration indicators (TCIs), a TCI set including one or more TCIs, or a TCI set in which an uplink TCI and a downlink TCI are connected in advance, transmitting one or more PDCCHs from one or more base stations, restoring the control channels, based on configured configuration information, and in case that the same control channels are identified in restoration of control information, processing the same. The method further includes, in configuring control information reception information, configuring one control channel resource and a control channel search region, configuring one or more control channel resources and one control channel search region, configuring one control channel resource and one or more control channel search regions, or configuring one or more control channel resources and one or more control channel search regions. The method may include at least one of configuring a transmission method in case that one piece of control information is transmitted by one or more base stations, and performing feedback by a terminal to update a beam configuration based on the received control channels.

A method of a base station in a communication system includes: transmitting, to a terminal, control channel configuration information including multiple pieces of transmission configuration indicator (TCI) information; transmitting downlink control information for scheduling of downlink data to the terminal on multiple downlink control channels according to multiple TCIs; and transmitting the downlink data to the terminal.

A method of a terminal in a communication system includes: receiving control channel configuration information including multiple pieces of transmission configuration indicator (TCI) information from a base station; receiving downlink control information for scheduling of downlink data from the base station on multiple downlink control channels according to multiple TCIs; and receiving the downlink data from the base station.

A base station in a communication system includes: a transceiver; and a controller connected to the transceiver and configured to perform control to transmit, to a terminal, control channel configuration information including multiple pieces of transmission configuration indicator (TCI) information, transmit downlink control information for scheduling of downlink data to the terminal on multiple downlink control channels according to multiple TCIs, and transmit the downlink data to the terminal.

A terminal in a communication system includes: a receiver; and a controller connected to the transceiver and configured to perform control to receive control channel configuration information including multiple pieces of transmission configuration indicator (TCI) information from a base station, receive downlink control information for scheduling of downlink data from the base station on multiple downlink control channels according to multiple TCIs, and receive the downlink data from the base station.

Advantageous Effects of Invention

According to an embodiment of the disclosure, the coverage and reliability of services in a mobile communication system are improved.

MODE FOR THE INVENTION

Figure 1:
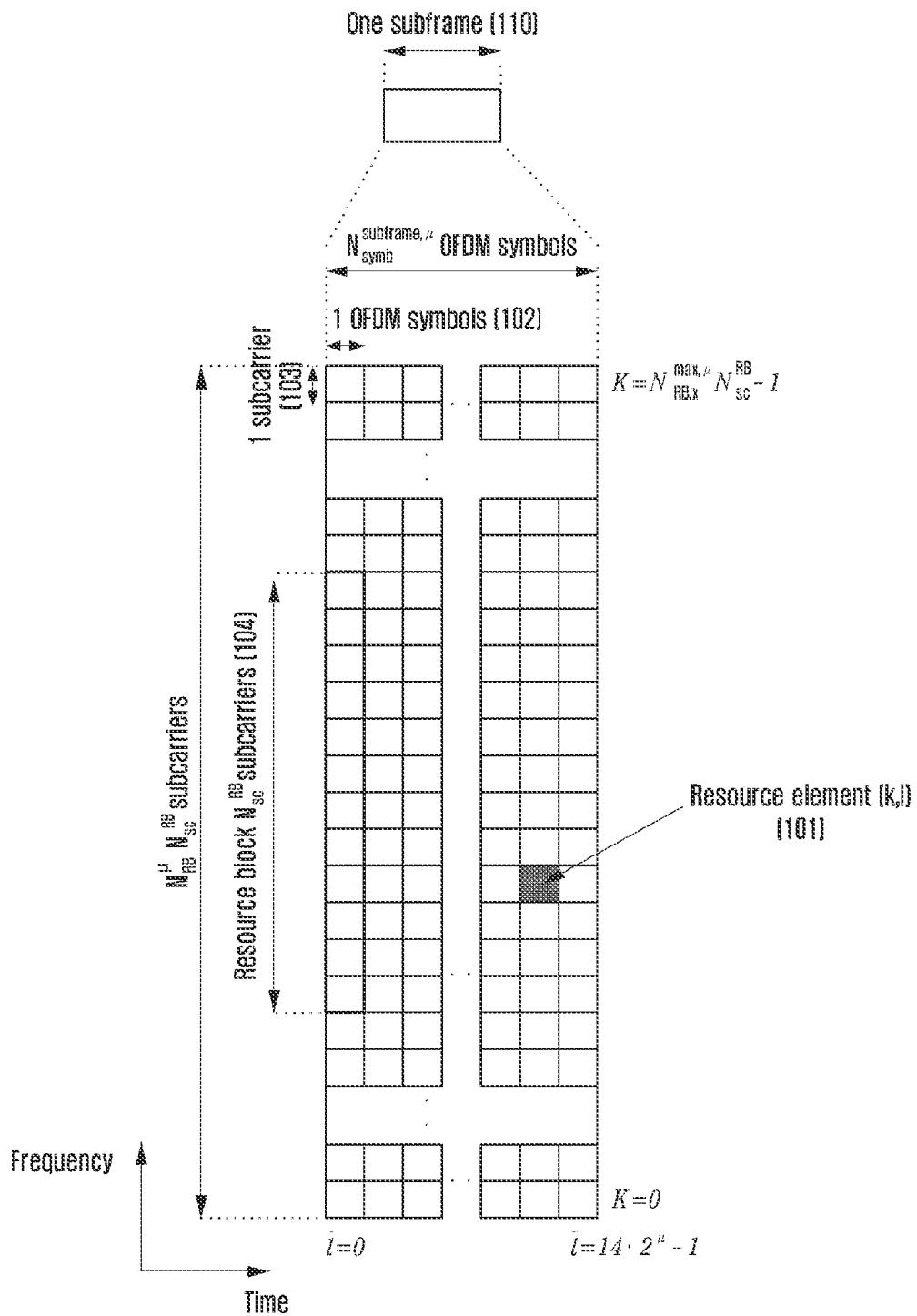
FIG. 1 is a diagram illustrating a basic structure of a time-frequency domain.

Hereinafter, embodiments of the disclosure will be described in detail with reference to the accompanying drawings.

In describing the embodiments, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements. Further, in describing the disclosure, a detailed description known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. In the disclosure, a "downlink (DL)" refers to a radio link via which a base station transmits a signal to a terminal, and an "uplink (UL)" refers to a radio link via which a terminal transmits a signal to a base station. Further, in the following description, LTE or LTE-A systems may be described by way of example, but the embodiments of the disclosure may also be applied to other communication systems having similar technical backgrounds or channel types. Examples of such communication systems may include 5th generation mobile communication technologies (5G, new radio, and NR) developed beyond LTE-A, and in the following description, the "5G" may be the concept that covers the exiting LTE, LTE-A, or other similar services. In addition, based on determinations by those skilled in the art, the embodiments of the disclosure may also be applied to other communication systems through some modifications without significantly departing from the scope of the disclosure.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved:

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

A wireless communication system is advancing to a broadband wireless communication system for providing high-speed and high-quality packet data services using communication standards, such as high-speed packet access (HSPA) of 3GPP, LTE {long-term evolution or evolved universal terrestrial radio access (E-UTRA)}, LTE-Advanced (LTE-A), LTE-Pro, high-rate packet data (HRPD) of 3GPP2, ultra-mobile broadband (UMB), IEEE 802.16e, and the like, as well as typical voice-based services.

As a typical example of the broadband wireless communication system, an LTE system employs an orthogonal frequency division multiplexing (OFDM) scheme in a downlink (DL) and employs a single carrier frequency division multiple access (SC-FDMA) scheme in an uplink (UL). The uplink indicates a radio link through which a user equipment (UE) {or a mobile station (MS)} transmits data or control signals to a base station (BS) (eNode B), and the downlink indicates a radio link through which the base station transmits data or control signals to the UE. The above multiple access scheme may separate data or control information of respective users by allocating and operating time-frequency resources for transmitting the data or control information for each user so as to avoid overlapping each other, that is, so as to establish orthogonality.

Since a 5G communication system, which is a post-LTE communication system, must freely reflect various requirements of users, service providers, and the like, services satisfying various requirements must be supported. The services considered in the 5G communication system include enhanced mobile broadband (eMBB) communication, massive machine-type communication (mMTC), ultra-reliability low-latency communication (URLLC), and the like.

eMBB aims at providing a data rate higher than that supported by existing LTE, LTE-A, or LTE-Pro. For example, in the 5G communication system, eMBB must provide a peak data rate of 20 Gbps in the downlink and a peak data rate of 10 Gbps in the uplink for a single base station. Furthermore, the 5G communication system must provide an increased user-perceived data rate to the UE, as well as the maximum data rate. In order to satisfy such requirements, transmission/reception technologies including a further enhanced multi-input multi-output (MIMO) transmission technique are required to be improved. In addition, the data rate required for the 5G communication system may be obtained using a frequency bandwidth more than 20 MHz in a frequency band of 3 to 6 GHz or 6 GHz or more, instead of transmitting signals using a transmission bandwidth up to 20 MHz in a band of 2 GHz used in LTE.

In addition, mMTC is being considered to support application services such as the Internet of Things (IoT) in the 5G communication system. mMTC has requirements, such as support of connection of a large number of UEs in a cell, enhancement coverage of UEs, improved battery time, a reduction in the cost of a UE, and the like, in order to effectively provide the Internet of Things. Since the Internet of Things provides communication functions while being provided to various sensors and various devices, it must support a large number of UEs (e.g., 1,000,000 UEs/km2) in a cell. In addition, the UEs supporting mMTC may require wider coverage than those of other services provided by the 5G communication system because the UEs are likely to be located in a shadow area, such as a basement of a building, which is not covered by the cell due to the nature of the service. The UE supporting mMTC must be configured to be inexpensive, and may require a very long battery life-time such as 10 to 15 years because it is difficult to frequently replace the battery of the UE.

Lastly, URLLC, which is a cellular-based mission-critical wireless communication service, may be used for remote control for robots or machines, industrial automation, unmanned aerial vehicles, remote health care, emergency alert, and the like. Thus, URLLC must provide communication with ultra-low latency and ultra-high reliability. For example, a service supporting URLLC must satisfy an air interface latency of less than 0.5 ms, and also requires a packet error rate of 10-5 or less. Therefore, for the services supporting URLLC, a 5G system must provide a transmit time interval (TTI) shorter than those of other services, and also may require a design for assigning a large number of resources in a frequency band in order to secure reliability of a communication link.

Three services in 5G, that is, eMBB, URLLC, and mMTC, may be multiplexed and transmitted in a single system. In this case, different transmission/reception techniques and transmission/reception parameters may be used between services in order to satisfy different requirements of the respective services. Of course, 5G is not limited to the three services described above.

Hereinafter, a frame structure of a 5G system will be described in more detail with reference to the drawings.

FIG. 1 is a diagram illustrating a basic structure of a time-frequency domain that is a radio resource region in which data or a control channel is transmitted in a 5G system.

In FIG. 1, a horizontal axis represents a time domain, and a vertical axis represents a frequency domain. A basic unit of resources in the time and frequency domains is a resource element (RE) 101, and may be defined to be 1 orthogonal frequency division multiplexing (OFDM) symbol 102 on the time axis and 1 subcarrier 103 on the frequency axis. $N_{sc}^{RB}$ consecutive REs (e.g., 12) in the frequency domain may constitute one resource block (RB) 104.

Figure 2:
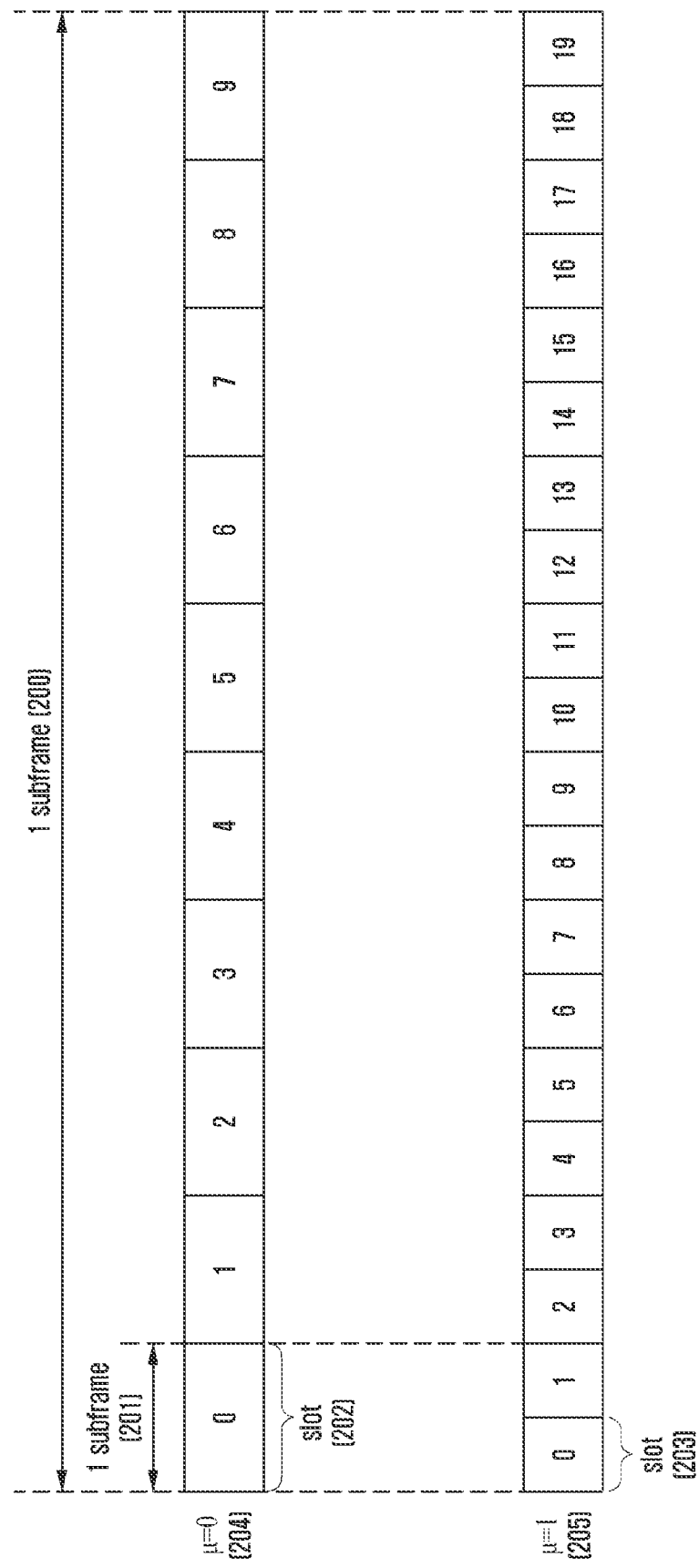
FIG. 2 is a diagram illustrating a structure of a frame, a subframe, and a slot.

FIG. 2 is a diagram illustrating a slot structure considered in a 5G system.

FIG. 2 illustrates an example of a structure of a frame 200, a subframe 201, and a slot 202. One frame 200 may be defined to be 10 ms. One subframe 201 may be defined to be 1 ms, and thus one frame 200 may include a total of 10 subframes 201. One slot 202 or 203 may be defined to be 14 OFDM symbols (that is, the number of symbols per slot ($N_{symb}^{slot}$)=14). One subframe 201 may include one or multiple slots 202 and 203, and the number of slots 202 and 203 per subframe 201 may vary according to configuration values u 204 and 205 for subcarrier spacings. In an example of FIG. 2, a case where μ=0 204, and a case where μ=1 205 are illustrated as subcarrier spacing configuration values. If u=0 204, one subframe 201 may include one slot 202, and if μ=1 205, one subframe 201 may include two slots 203. That is, the number ($N_{slot}^{subframe,\mu}$) of slots per subframe may vary according to configuration value u for a subcarrier spacing, and accordingly, the number ($N_{slot}^{frame,\mu}$) of slots per frame may vary. $N_{slot}^{subframe,\mu}$ and $N_{slot}^{frame,\mu}$ according to respective subcarrier spacing configurations u may be defined in Table 1 below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 130 | 32 |

Figure 3:
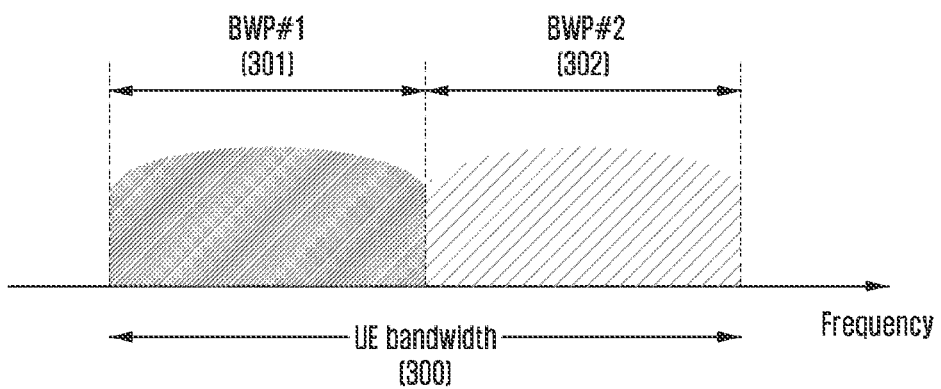
FIG. 3 is a diagram illustrating an example of a bandwidth part configuration.

Subsequently, a bandwidth part (BWP) configuration in the 5G communication system will be described in detail with reference to FIG. 3. FIG. 3 is a diagram illustrating an example of a configuration for a bandwidth part in the 5G communication system.

FIG. 3 shows an example in which a terminal bandwidth (UE bandwidth) 300 is configured to have two bandwidth parts that are bandwidth part #1 301 and bandwidth part #2 302. A base station may configure one or multiple bandwidth parts for a terminal, and may configure the following information for each bandwidth part.

TABLE 2

| BWP :: = | SEQUENCE { |
|---|---|
| bwp-Id | BWP-Id, |
| (Bandwidth part identifier) | |
| locationAndBandwidth | INTEGER (1..65536), |
| (Bandwidth part position) | |
| subcarrierSpacing | ENUMERATED {n0, n1, n2, n3, n4, n5}, |
| (Subcarrier spacing) | |
| cyclicPrefix | ENUMERATED { extended } |
| (Cyclic prefix) | |
| } | |

The disclosure is not limited to the above example, and in addition to the configuration information, various parameters related to the bandwidth part may be configured for a terminal. The base station may transfer the information to the terminal via higher layer signaling, for example, radio resource control (RRC) signaling. At least one bandwidth part among the configured one or multiple bandwidth parts may be activated. Whether the configured bandwidth part is active may be transferred from the base station to the terminal in a semi-static manner via RRC signaling or may be dynamically transferred via downlink control information (DCI). According to some embodiments, the base station may configure an initial bandwidth part (BWP) for initial access, via a master information block (MIB), for the terminal before an RRC connection. More specifically, during the initial access, the terminal may receive configuration information for a search space and a control resource set (CORESET) in which a PDCCH for receiving system information (may correspond to remaining system information (RMSI) or system information block 1 (SIB1)) required for the initial access may be transmitted via the MIB. Each of the search space and the control resource set configured via the MIB may be considered to be identifier (identity (ID)) 0. The base station may notify, via the MIB, the terminal of configuration information, such as frequency assignment information, time assignment information, and numerology for control resource set #0. In addition, the base station may notify, via the MIB, the terminal of configuration information for a monitoring period and occasion for control resource set #0, that is, the configuration information for search space #0. The terminal may consider a frequency domain configured to control resource set #0, which is obtained from the MIB, as an initial bandwidth part for initial access. In this case, an identity (ID) of the initial bandwidth part may be considered to be 0.

The configuration of a bandwidth part supported by the 5G communication system may be used for various purposes.

According to some embodiments, if a bandwidth supported by the terminal is smaller than a system bandwidth, this may be supported via the bandwidth part configuration. For example, the base station may configure, for the terminal, a frequency position (configuration information 2) of the bandwidth part, and the terminal may thus transmit or receive data at a specific frequency position within the system bandwidth.

According to some embodiments, for the purpose of supporting different numerologies, the base station may configure multiple bandwidth parts for the terminal. For example, in order to support both data transmission and reception using a subcarrier spacing of 15 kHz and a subcarrier spacing of 30 kHz for a terminal, two bandwidth parts may be configured with the subcarrier spacings of 15 kHz and 30 kHz, respectively. Different bandwidth parts may be frequency-division-multiplexed, and when data is to be transmitted or received at a specific subcarrier spacing, a bandwidth part configured with the subcarrier spacing may be activated.

According to some embodiments, for the purpose of reducing power consumption of the terminal, the base station may configure, for the terminal, bandwidth parts having different bandwidth sizes. For example, if the terminal supports a very large bandwidth, for example, 100 MHz, and always transmits or receives data via the corresponding bandwidth, very large power consumption may occur. In particular, in a situation where there is no traffic, it may be very inefficient, in terms of power consumption, to perform monitoring for an unnecessary downlink control channel with a large bandwidth of 100 MHz. For the purpose of reducing the power consumption of the terminal, the base station may configure, for the terminal, a bandwidth part of a relatively small bandwidth, for example, a bandwidth part of 20 MHz. In the situation where there is no traffic, the terminal may perform monitoring in the bandwidth part of 20 MHz, and when data is generated, the terminal may transmit or receive the data by using the bandwidth part of 100 MHz according to an indication of the base station.

In the method for configuring the bandwidth part, terminals before an RRC connection may receive configuration information for an initial bandwidth part via a master information block (MIB) during initial access. More specifically, a terminal may be configured with a control resource set (CORESET) for a downlink control channel through which downlink control information (DCI) for scheduling of a system information block (SIB) may be transmitted from an MIB of a physical broadcast channel (PBCH). The bandwidth of the control resource set, which is configured via the MIB may be considered to be the initial bandwidth part, and the terminal may receive a physical downlink shared channel (PDSCH), through which the SIB is transmitted, via the configured initial bandwidth part. In addition to reception of the SIB, the initial bandwidth part may be used for other system information (OSI), paging, and random-access.

Subsequently, a synchronization Signal/physical broadcast channel (SS/PBCH) block in the 5G communication system will be described.

The SS/PBCH block may refer to a physical layer channel block including a primary SS (PSS), a secondary SS (SSS), and a PBCH. Detailed descriptions are as follows.

PSS: A PSS is a signal that serves as a reference for downlink time/frequency synchronization, and provides some information of a cell ID.

SSS: An SSS serves as a reference for downlink time/frequency synchronization, and provides the remaining cell ID information that is not provided by a PSS. Additionally, the SSS may serve as a reference signal for demodulation of a PBCH.

PBCH: A PBCH provides essential system information necessary for transmission or reception of a data channel and a control channel of a terminal. The essential system information may include search space-related control information indicating radio resource mapping information of a control channel, scheduling control information on a separate data channel for transmission of system information, and the like.

SS/PBCH block: An SS/PBCH block includes a combination of a PSS, an SSS, and a PBCH. One or multiple SS/PBCH blocks may be transmitted within 5 ms, and each transmitted SS/PBCH block may be distinguished by an index.

The terminal may detect a PSS and an SSS during initial access and may decode a PBCH. An MIB may be obtained from the PBCH, and control resource set (CORESET) #0 (which may correspond to a control resource set having a control resource set index of 0) may be configured therefrom. The terminal may perform monitoring on control resource set #0 while assuming that a selected SS/PBCH block and a demodulation reference signal (DMRS) transmitted in control resource set #0 are quasi co-located (QCL). The terminal may receive system information as downlink control information transmitted in control resource set #0. The terminal may obtain random-access channel (RACH)-related configuration information required for initial access from the received system information. The terminal may transmit a physical RACH (PRACH) to the base station in consideration of a selected SS/PBCH index, and the base station having received the PRACH may obtain information on the SS/PBCH block index selected by the terminal. The base station may be informed that the terminal has selected a certain block from among respective SS/PBCH blocks and monitors control resource set #0 associated therewith.

Subsequently, downlink control information (DCI) in the 5G system will be described in detail.

In the 5G system, scheduling information for uplink data (or physical uplink data channel (physical uplink shared channel, PUSCH)) or downlink data (or physical downlink data channel (physical downlink shared channel, PDSCH)) is transferred from the base station to the terminal via DCI. The terminal may monitor a fallback DCI format and a non-fallback DCI format for the PUSCH or the PDSCH. The fallback DCI format may include a fixed field predefined between the base station and the terminal, and the non-fallback DCI format may include a configurable field.

The DCI may be transmitted on a physical downlink control channel (PDCCH) via channel coding and modulation. A cyclic redundancy check (CRC) is attached to a DCI message payload, and may be scrambled with a radio network temporary identifier (RNTI) corresponding to an identity of the terminal. Different RNTIs may be used according to a purpose of the DCI message, for example, terminal-specific (UE-specific) data transmission, a power control command, a random-access response, or the like. In other words, the RNTI is not transmitted explicitly, but is included in CRC calculation and transmitted. When the DCI message transmitted on the PDCCH is received, the terminal may check the CRC by using an assigned RNTI and may determine, if a CRC check result is correct, that the message is transmitted to the terminal.

For example, DCI for scheduling of a PDSCH for system information (SI) may be scrambled with an SI-RNTI. DCI for scheduling of a PDSCH for a random-access response (RAR) message may be scrambled with an RA-RNTI. DCI for scheduling of a PDSCH for a paging message may be scrambled with a P-RNTI. DCI for notification of a slot format indicator (SFI) may be scrambled with an SFI-RNTI. DCI for notification of a transmit power control (TPC) may be scrambled with a TPC-RNTI. DCI for scheduling of a UE-specific PDSCH or PUSCH may be scrambled with a cell RNTI (C-RNTI).

DCI format 0_0 may be used as fallback DCI for scheduling of a PUSCH, wherein a CRC is scrambled with a C-RNTI. DCI format 0_0 in which the CRC is scrambled with the C-RNTI may include, for example, information in Table 3 below.

TABLE 3

Identifier for DCI formats - [1] bit
Frequency domain resource assignment -[$\lceil \log_2(N_{RB}^{UL,BWP} (N_{RB}^{UL,BWP} + 1)/2 \rceil$] bits
Time domain resource assignment - X bits
Frequency hopping flag - 1 bit
Modulation and coding scheme - 5 bits
Xew data indicator - 1 bit
Redundancy version - 2 bits
HARQ process number - 4 bits
Transmit power control (TPC) command for scheduled PUSCH - [2] bits
- Uplink (UL)/supplementary UL (SUL) indicator - 0 or 1 bit DCI format 0_1 may be used as non-fallback DCI for scheduling of a PUSCH, wherein a CRC is scrambled with a C-RNTI. DCI format 0_1 in which the CRC is scrambled with the C-RNTI may include, for example, information in Table 4 below.

TABLE 4

Carrier indicator - 0 or 3 bits
UL/SUL indicator - 0 or 1 bit
Identifier for DCI formats - [1] bits
Bandwidth part indicator - 0, 1 or 2 bits
Frequency domain resource assignment
For resource allocation type 0, $\lceil N_{RB}^{UL,BWP}/P \rceil$ bits
For resource allocation type 1, $\lceil \log_2(N_{RB}^{UL,BWP}(N_{RB}^{UL,BWP} + 1)/2 \rceil$ bits
Time domain resource assignment - 1, 2, 3, or 4 bits
Virtual resource block (VRB)-to-physical resource block (PRB) mapping - 0 or 1 bit, only for resource allocation type 1.
0 bit if only resource allocation type 0 is configured;
1 bit otherwise.
Frequency hopping flag - 0 or 1 bit, only for resource allocation type 1.
0 bit if only resource allocation type 0 is configured;
1 bit otherwise.
Modulation and coding scheme - 5 bits
New data indicator - 1 bit
Redundancy version - 2 bits
HARQ process number - 4 bits
1st downlink assignment index - 1 or 2 bits
1 bit for semi-static HARQ-ACK codebook;
2 bits for dynamic HARQ-ACK codebook with single HARQ-ACK codebook (when dynamic HARQ-ACK codebook is used with a single HARQ-ACK codebook).
2nd downlink assignment index - 0 or 2 bits
2 bits for dynamic HARQ-ACK codebook with two HARQ-ACK sub-codebooks (when dynamic HARQ-ACK codebook is used with two HARQ-ACK sub-codebooks);
0 bit otherwise.
TPC command for scheduled PUSCH - 2 bits SRS resource indicator $-\left\lceil \log_2\left(\sum_{k=1}^{L_{max}}\binom{N_{SRS}}{k}\right)\right\rceil$ or $\lceil \log_2(N_{SRS})\rceil$ bits $\left\lceil \log_2\left(\sum_{k=1}^{L_{max}}\binom{N_{SRS}}{k}\right)\right\rceil$ bits for non-codebook based PUSCH transmission (when PUSCH transmission is not based on codebook);
$\lceil \log_2(N_{SRS})\rceil$ bits for codebook based PUSCH transmission (when PUSCH transmission is based on codebook).
Precoding information and number of layers - up to 6 bits
Antenna ports - up to 5 bits
SRS request - 2 bits
Channel state information (CSI) request - 0, 1, 2, 3, 4, 5, or 6 bits
Code block group (CBG) transmission information - 0, 2, 4, 6, or 8 bits
Phase tracking reference signal (PTRS)-demodulation reference signal (DMRS) association - 0 or 2 bits.
beta_offset indicator - 0 or 2 bits -
Demodulation reference signal (DMRS) sequence initialization - 0 or 1 bit DCI format 1_0 may be used as fallback DCI for scheduling of a PDSCH, wherein a CRC is scrambled with a C-RNTI. DCI format 0_1 in which the CRC is scrambled with the C-RNTI may include, for example, information in Table 5 below.

TABLE 5

Identifier for DCI formats - [1] bit
Frequency domain resource assignment - [$\lceil \log_2(N_{RB}^{DL, BWP} (N_{RB}^{DL, BWP} + 1)/2)\rceil$] bits
Time domain resource assignment - 4 bits
VRB-to-PRB mapping - 1 bit
Modulation and coding scheme - 5 bits
New data indicator - 1 bit
Redundancy version - 2 bits
HARQ process number - 4 bits
Downlink assignment index - 2 bits
TPC command for scheduled PUCCH - [2] bits
Physical uplink control channel (PUCCH) resource indicator - 3 bits
- PDSCH-to-HARQ feedback timing indicator - [3] bits DCI format 1_1 may be used as non-fallback DCI for scheduling of a PDSCH, wherein a CRC is scrambled with a C-RNTI. DCI format 1_1 in which the CRC is scrambled with the C-RNTI may include, for example, information in Table 6 below.

TABLE 6

Carrier indicator - 0 or 3 bits
Identifier for DCI formats - [1] bits
Bandwidth part indicator - 0, 1 or 2 bits
Frequency domain resource assignment
For resource allocation type 0, $\lceil N_{RB}^{DL, BWP}/P \rceil$ bits
For resource allocation type 1, $\lceil \log_2(N_{RB}^{DL, BWP} (N_{RB}^{DL, BWP} + 1)/2)\rceil$ bits
Time domain resource assignment - 1, 2, 3, or 4 bits
VRB-to-PRB mapping - 0 or 1 bit, only for resource allocation type 1.
0 bit if only resource allocation type 0 is configured;
1 bit otherwise.
Physical resource block (PRB) bundling size indicator - 0 or 1 bit
Rate matching indicator - 0, 1, or 2 bits
Zero-power (ZP) channel state information reference signal (CSI-RS) trigger - 0, 1, or 2 bits
For transport block 1 (For first transmission block):
Modulation and coding scheme - 5 bits
New data indicator - 1 bit
Redundancy version - 2 bits
For transport block 2 (For second transmission block):
Modulation and coding scheme - 5 bits
New data indicator - 1 bit
Redundancy version - 2 bits
HARQ process number - 4 bits
Downlink assignment index - 0 or 2 or 4 bits
TPC command for scheduled PUCCH - 2 bits
PUCCH resource indicator - 3 bits
PDSCH-to-HARQ_feedback timing indicator - 3 bits
Antenna ports - 4, 5 or 6 bits
Transmission configuration indication (TCI) - 0 or 3 bits
SRS request - 2 bits
CBG transmission information - 0, 2, 4, 6, or 8 bits
Codeblock group (CBG) flushing out information - 0 or 1 bit
- DMRS sequence initialization - 1 bit Hereinafter, a time domain resource allocation method for a data channel in the 5G communication system will be described. The base station may configure, for the terminal via higher layer signaling (e.g., RRC signaling), a table for time domain resource allocation information on a downlink data channel (physical downlink shared channel (PDSCH)) and an uplink data channel (physical uplink shared channel (PUSCH)). A table including up to 16 entries (maxNrofDL-Allocations=16) may be configured for the PDSCH, and a table including up to 16 entries (maxNrofUL-Allocations=16) may be configured for the PUSCH. The time domain resource allocation information may include, for example, a PDCCH-to-PDSCH slot timing (denoted as K0, and corresponding to a time interval in units of slots between a time point at which a PDCCH is received and a time point at which a PDSCH scheduled by the received PDCCH is transmitted), a PDCCH-to-PUSCH slot timing (denoted as K2, and corresponding to a time interval in units of slots between a time point at which a PDCCH is received and a time point at which a PUSCH scheduled by the received PDCCH is transmitted), information on a position and length of a start symbol in which the PDSCH or PUSCH is scheduled within a slot, a mapping type of the PDSCH or PUSCH, or the like. For example, information as shown in [Table 7] and [Table 8] below may be notified to the terminal by the base station.

TABLE 7

PDSCH-TimeDomainResourceAllocationList information element
PDSCH-TimeDomainResourceAllocationList  ::  = SEQUENCE
(SIZE(1..maxNrofDL-Allocations)) OF PDSCH-TimeDomainResource
Allocation
PDSCH-TimeDomainResource Allocation :: = SEQUENCE {
k0                                          INTEGER(0..32)
OPTIONAL, -- Need S
(PDCCH-to-PDSCH timing, slot unit)
mappingType                                 ENUMERATED {typeA,
typeB},
(PDSCH mapping type)
startSymbolAndLength                        INTEGER (0..127)
(PDSCH start symbol and length)
}

TABLE 8

PUSCH-TimeDomainResourceAllocation information element
PUSCH-TimeDomainResourceAllocationList  ::  = SEQUENCE
(SIZE(1..maxNrofDL-Allocations)) OF PUSCH-TimeDomainResource
Allocation
PUSCH-TimeDomainResourceAllocation :: = SEQUENCE {
k2                                          INTEGER(0..32)
OPTIONAL, -- Need S
(PDCCH-to-PUSCH timing, slot unit)
mappingType                                 ENUMERATED {typeA,
typeB},
(PUSCH mapping type)
startSymbol And Length                      INTEGER (0..127)
(PUSCH start symbol and length)
}

The base station may notify one of the entries in the tables relating to the time domain resource allocation information to the terminal via L1 signaling (e.g., DCI) (e.g., the entry may be indicated by a "time domain resource allocation" field in the DCI). The terminal may obtain the time domain resource allocation information for the PDSCH or PUSCH, based on the DCI received from the base station. Hereinafter, a downlink control channel in the 5G communication system will be described in more detail with reference to the drawings.

Figure 4:
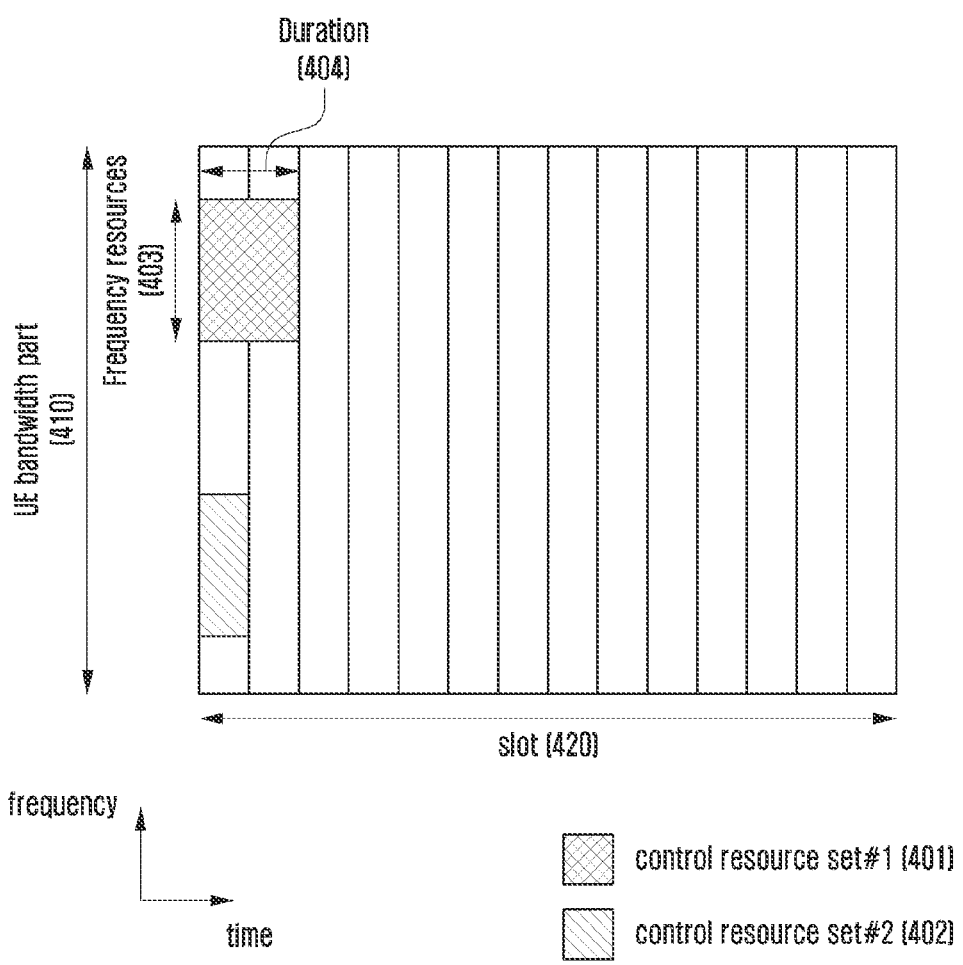
FIG. 4 is a diagram illustrating an example of a control resource set configuration of a downlink control channel.

FIG. 4 is a diagram illustrating an example of a control resource set (CORESET) at which a downlink control channel is transmitted in the 5G wireless communication system.

FIG. 4 illustrates an example in which a bandwidth part 410 of a terminal (UE bandwidth part) is configured on the frequency axis, and two control resource sets (control resource set #1 401 and control resource set #2 402) are configured within one slot 420 on the time axis. The control resource sets 401 and 402 may be configured in a specific frequency resource 403 within the entire UE bandwidth part 410 on the frequency axis. One or multiple OFDM symbols may be configured on the time axis and may be defined as a control resource set duration 404. Referring to the example illustrated in FIG. 4, control resource set #1 401 is configured to a control resource set duration of 2 symbols, and control resource set #2 402 is configured to a control resource set duration of 1 symbol.

The aforementioned control resource set in the 5G communication system may be configured for the terminal by the base station via higher layer signaling (e.g., system information, a master information block (MIB), and radio resource control (RRC) signaling). Configuring a control resource set for a terminal refers to providing information, such as an identity of the control resource set, a frequency position of the control resource set, and a symbol length of the control resource set. For example, information in Table 9 below may be included.

TABLE 9

ControlResourceSet :: =                     SEQUENCE {
Corresponds to L1 parameter "CORESET-ID"
controlResourceSetId         ControlResourceSetId,
(Control resource set identity)
frequencyDomainResources     BIT STRING (SIZE (45)),
(Frequency axis resource allocation information)
duration                     INTEGER (1..maxCoReSetDuration),
(Time axis resource allocation information)
cce-REG-MappingType                         CHOICE {
(CCE-to-REG mapping scheme)
interleaved                                 SEQUENCE {
reg-BundleSize                              ENUMERATED {n2, n3, n6},
(REG bundle size)
precoderGranularity                         ENUMERATED {sameAsREG-
bundle, allContiguousRBs},
interleaverSize                             ENUMERATED {n2, n3, n6}
(Interleaver size)
shiftIndex
    INTEGER(0..maxNrofPhysicalResourceBlocks-1)
        OPTIONAL
(Interleaver shift)
},
nonInterleaved              NULL
},
tci-StatesPDCCH                             SEQUENCE(SIZE
(1..maxNrofTCI-StatesPDCCH)) OF TCI-StateId
    OPTIONAL,
(QCL configuration information)
tci-PresentInDCI            ENUMERATED {enabled}
                            OPTIONAL, -- Need S
}

Figure 5:
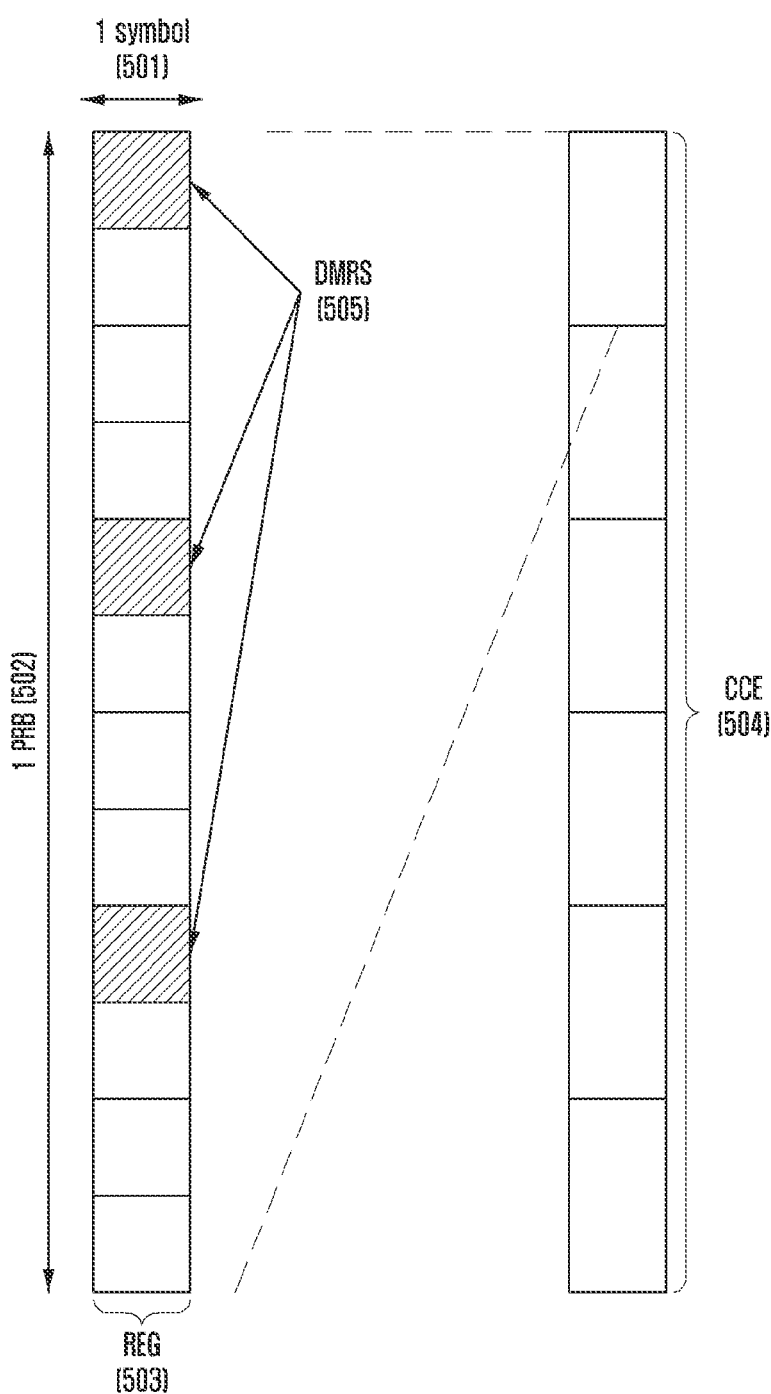
FIG. 5 is a diagram illustrating a structure of a downlink control channel.

In Table 9, tci-StatesPDCCH (simply, referred to as a transmission configuration indication (TCI) state) configuration information may include information on one or multiple synchronization signal (SS)/physical broadcast channel (PBCH) block indices or channel state information reference signal (CSI-RS) indices having the quasi co-located (QCL) relationship with a DMRS transmitted in the corresponding control resource set. FIG. 5 is a diagram showing an example of a basic unit of time and frequency resources constituting a downlink control channel which may be used in the 5G communication system.

According to FIG. 5, a basic unit of time and frequency resources constituting a control channel is referred to as a resource element group (REG) 503, and an REG 503 may be defined to have 1 OFDM symbol 501 on the time axis and 1 physical resource block (PRB) 502, that is, 12 subcarriers, on the frequency axis. A base station may configure a downlink control channel allocation unit by concatenation with the REG 503.

As illustrated in FIG. 5, when a basic unit for allocation of a downlink control channel is a control channel element (CCE) 504, 1 CCE 504 may include multiple REGs 503. When the REG 503 illustrated in FIG. 5 is described as an example, the REG 503 may include 12 REs, and if 1 CCE 504 includes 6 REGs 503, 1 CCE 504 may include 72 REs. When a downlink control resource set is configured, a corresponding region may include multiple CCEs 504, and a specific downlink control channel may be mapped to one or multiple CCEs 504 so as to be transmitted according to an aggregation level (AL) within the control resource set. The CCEs 504 within the control resource set are classified by numbers, and the numbers of the CCEs 504 may be assigned according to a logical mapping scheme.

The basic unit of the downlink control channel illustrated in FIG. 5, that is, the REG 503, may include both REs, to which DCI is mapped, and a region to which a DMRS 505, which is a reference signal for decoding of the REs, is mapped. As shown in FIG. 5, 3 DMRSs 505 may be transmitted in 1 REG 503. The number of CCEs required to transmit a PDCCH may be 1, 2, 4, 8, or 16 depending on the aggregation level (AL), and different numbers of CCEs may be used to implement link adaptation of the downlink control channel. For example, if AL=L, a single downlink control channel may be transmitted via L number of CCEs. The terminal needs to detect a signal without knowing of information on the downlink control channel, wherein a search space (SS) representing a set of CCEs is defined for blind decoding. The search space is a set of downlink control channel candidates including CCEs, for which the terminal needs to attempt decoding on a given aggregation level, and since there are various aggregation levels that make one bundle with 1, 2, 4, 8, or 16 CCEs, the terminal may have multiple search spaces. The search space set may be defined as a set of search spaces at all configured aggregation levels.

The search space may be classified into a common search space and a terminal-specific (UE-specific) search space. A certain group of terminals or all terminals may examine a common search space of the PDCCH in order to receive cell-common control information, such as a dynamic scheduling or paging message for system information. For example, PDSCH scheduling assignment information for transmission of an SIB including cell operator information, etc. may be received by examining the common search space of the PDCCH. In the case of the common search space, the certain group of terminals or all terminals need to receive the PDCCH, and may thus be defined as a set of predetermined CCEs. Scheduling assignment information for a UE-specific PDSCH or PUSCH may be received by examining the UE-specific search space of the PDCCH. The UE-specific search space may be defined UE-specifically, based on an identity of the terminal and functions of various system parameters.

In the 5G communication system, a parameter for the search space of the PDCCH may be configured by the base station for the terminal via higher layer signaling (e.g., SIB, MIB, and RRC signaling). For example, the base station may configure, for the terminal, the number of PDCCH candidates at each aggregation level L, a monitoring period for a search space, a monitoring occasion in units of symbols in the slot for the search space, a search space type (common search space or UE-specific search space), a combination of an RNTI and a DCI format, which is to be monitored in the search space, a control resource set index for monitoring of the search space, etc. For example, higher layer signaling may include information of Table 10 below.

TABLE 10

SearchSpace :: =　　　　　SEQUENCE {
Identity of the search space. SearchSpaceId = 0 identifies the SearchSpace configured via PBCH (MIB) or ServingCellConfigCommon.
SearchSpaceId　　　　　　SearchSpaceId,
(Search space identifier)
controlResource SetId　　　ControlResourceSetId,
(Control resource set identifier)
monitoringSlotPeriodicityAndOffset　　CHOICE {
(Monitoring slot level period)
sl1　　　　　　　　NULL,
sl2　　　　　　　　INTEGER (0..1),
sl4　　　　　　　　INTEGER (0..3),
sl5　　　　　　　　INTEGER (0..4),
sl8　　　　　　　　INTEGER (0..7),
sl10　　　　　　　INTEGER (0..9),
sl16　　　　　　　INTEGER (0..15),
sl20　　　　　　　INTEGER (0..19)
}
　　　　　　　　　OPTIONAL,
duration (monitoring duration)　　INTEGER (2..2559)
monitoringSymbolsWithinSlot　　BIT STRING (SIZE (14))
　　　　　　　　　OPTIONAL,
(Monitoring symbol in slot)
nrofCandidates　　　SEQUENCE {
(The number of PDCCH candidate groups for each aggregation level)
aggregationLevel1　　ENUMERATED {n0, n1, n2, n3, n4, n5, n6, n8},
aggregationLevel2　　ENUMERATED {n0, n1, n2, n3, n4, n5, n6, n8},
aggregationLevel4　　ENUMERATED {n0, n1, n2, n3, n4, n5, n6, n8},
aggregationLevel8　　ENUMERATED {n0, n1, n2, n3, n4, n5, n6, n8},
aggregationLevel16　ENUMERATED {n0, n1, n2, n3, n4, n5, n6, n8}
},
searchSpaceType　　CHOICE {
(Search space type)
Configures this search space as common search space (CSS) and DCI formats to monitor.
common　　　　　SEQUENCE {
(Common search space)
}
ue-Specific　　　　SEQUENCE {
(UE-specific search space)
Indicates whether the UE monitors in this USS for DCI formats 0-0 and 1-0 or for formats 0-1 and 1-1.
formats　　　　　ENUMERATED {formats0-0-And-1-0, formats0-1-And-1-1},
...
}

According to the configuration information, the base station may configure one or multiple search space sets for the terminal. According to some embodiments, the base station may configure search space set 1 and search space set 2 for the terminal, may configure DCI format A, which is scrambled with an X-RNTI in search space set 1, to be monitored in the common search space, and may configure DCI format B, which is scrambled with a Y-RNTI in search space set 2, to be monitored in the UE-specific search space. According to the configuration information, one or multiple search space sets may exist in the common search space or the UE-specific search space. For example, search space set #1 and search space set #2 may be configured to be a common search space, and search space set #3 and search space set #4 may be configured to be a UE-specific search space.

In the common search space, the following combinations of DCI formats and RNTIs may be monitored. Of course, the disclosure is not limited to the following examples.

DCI format 0_0/1_0 with CRC scrambled by C-RNTI, CS-RNTI, SP-CSI-RNTI, RA-RNTI, TC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI In the UE-specific search space, the following combinations of DCI formats and RNTIs may be monitored. Of course, the disclosure is not limited to the following examples.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

The specified RNTIs may follow the following definitions and uses.

Cell RNTI (C-RNTI): For UE-specific PDSCH scheduling

Temporary cell RNTI (TC-RNTI): For UE-specific PDSCH scheduling

Configured scheduling RNTI (CS-RNTI): For semi-statically configured UE-specific PDSCH scheduling Random-Access RNTI (RA-RNTI): For PDSCH scheduling at random-access stage Paging RNTI (P-RNTI): For scheduling PDSCH on which paging is transmitted System Information RNTI (SI-RNTI): For scheduling PDSCH on which system information is transmitted Interruption RNTI (INT-RNTI): For indicating whether to puncture PDSCH Transmit power control for PUSCH RNTI (TPC-PUSCH-RNTI): For indicating power control command for PUSCH Transmit power control for PUCCH RNTI (TPC-PUCCH-RNTI): For indicating power control command for PUCCH Transmit power control for SRS RNTI (TPC-SRS-RNTI): For indicating power control command for SRS The aforementioned DCI formats may conform to the following definition.

TABLE 11

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

Control resource set p and a search space of aggregation level L in search space set s may be expressed as Equation below.

$$L \cdot \left\{ \left( Y_{p,n_{s,f}^\mu} + \left\lfloor \frac{m_{s,n_{CI}} \cdot N_{CCE,p}}{L \cdot M_{p,s,max}^{(L)}} \right\rfloor + n_{CI} \right) \mod \left\lfloor \frac{N_{CCE,p}}{L} \right\rfloor \right\}$$ [Equation 1]

$N_{CCE,p}$: a total number of CCEs existing in control resource set p $n_{s,f}^\mu$: slot index $M_{p,s,max}^{(L)}$: the number of PDCCH candidates of aggregation level L $M_{s_nC_I}=0, \ldots, M_{p,s,max}^{(L)}$: the indices of PDCCH candidates of aggregation level L i=0, . . . , L−1

$Y_{p,n_{s,f}^\mu}=(A_p \cdot Y_{p,n_{s,f}^\mu}-1) \mod D$, $Y_{p,-1}=n_{RNTI}\neq 0$, A0-39827, A1=39829, A2-39839, D=65537

$n_{RNTI}$: terminal identity

A value of $Y\_(p,n_{s,f}^\mu)$ may correspond to 0 in the case of a common search space.

In the case of the UE-specific search space, a value of $Y\_(p,n_{s,f}^\mu)$ may correspond to a value that varies depending on a time index and the identity (ID configured for the terminal by the base station or C-RNTI) of the terminal.

In the 5G communication system, multiple search space sets may be configured by different parameters (e.g., parameters in Table 10), and therefore a set of search spaces monitored by the terminal at each time point may vary. For example, if search space set #1 is configured in an X-slot period, search space set #2 is configured in a Y-slot period, and X and Y are thus different from each other, the terminal may monitor both search space set #1 and search space set #2 in a specific slot, and may monitor one of search space set #1 and search space set #2 in the specific slot.

When multiple search space sets are configured for the terminal, the following conditions may be considered for a method of determining a search space set required to be monitored by the terminal.

[Condition 1: Limiting the Maximum Number of PDCCH Candidates]

The number of PDCCH candidates that may be monitored per slot does not exceed $M^\mu$. $M^\mu$ may be defined to be up to PDCCH candidates per slot in a cell configured to a subcarrier spacing of 15·2 μkHz, and may be defined as shown in [Table 12] below.

TABLE 12

| μ | Maximum number of PDCCH candidates per slot and per serving cell ($M^\mu$) |
| --- | --- |
| 0 | 44 |
| 1 | 36 |
| 2 | 22 |
| 3 | 20 |

[Condition 2: Limiting the maximum number of CCEs] The number of CCEs constituting the entire search space (here, the entire search space refers to the entire CCE set corresponding to a union region of multiple search space sets) per slot does not exceed CH. CH may be defined by the maximum number of CCEs per slot in a cell configured to a subcarrier spacing of 15·2 μkHz, and may be defined as shown in [Table 13] below.

TABLE 13

| μ | Maximum number of CCEs per slot and per serving cell ($C^μ$) |
|---|---|
| 0 | 56 |
| 1 | 56 |
| 2 | 48 |
| 3 | 32 |

For the convenience of description, a situation in which both conditions 1 and 2 are satisfied at a specific time point is defined as "condition A". Therefore, not satisfying condition A may refer to not satisfying at least one of conditions 1 and 2. According to configurations of the search space sets by the base station, a case in which condition A is not satisfied at a specific time point may occur. If condition A is not satisfied at a specific time point, the terminal may select and monitor only some of the search space sets configured to satisfy condition A at the corresponding time point, and the base station may transmit a PDCCH in the selected search space sets.

The method of selecting some search spaces from the entire configured search space set may conform to the following methods.

[Method 1]

If condition A for the PDCCH fails to be satisfied at a specific time point (slot), The terminal (or base station) may select a search space set, in which a search space type has been configured to be a common search space, over a search space set configured to be a UE-specific search space, from among the search space sets that exist at the corresponding time point.

If all the search space sets configured to be the common search space are selected (that is, if condition A is satisfied even after all the search spaces configured to be the common search space are selected), the terminal (or base station) may select the search space sets configured to be the UE-specific search space. In this case, if there are multiple search space sets configured to be the UE-specific search spaces, a search space set having a low search space set index may have a higher priority. In consideration of the priority, the UE-specific search space sets may be selected within a range in which condition A is satisfied.

In the 5G system, a control resource set may include $N_{RB}^{CORESET}$ RBs in the frequency domain, and may include $N_{symb}^{CORESET} \in \{1,2,3\}$ symbols in the time axis. One CCE may include 6 REGs, and a REG may be defined as 1 RB for 1 OFDM symbol period. In one control resource set, REGs may be indexed in a time-first order, starting with REG index 0 from a first OFDM symbol, a lowest RB, of the control resource set.

The 5G system supports an interleaved scheme and a non-interleaved scheme as a method of transmitting a PDCCH. The base station may configure, for the terminal via higher layer signaling, whether to perform interleaved or non-interleaved transmission for each control resource set. Interleaving may be performed in units of REG bundles. An REG bundle may be defined as a set of one or multiple REGs. The terminal may determine a CCE-to-REG mapping scheme in a corresponding control resource set in the manner shown in Table 14 below, depending on the interleaved or non-interleaved transmission configured from the base station.

TABLE 14

The CCE-to-REG mapping for a control-resource set can be interleaved or non-interleaved and is described by REG bundles:
- REG bundle i is defined as REGs {iL, iL+1,..., iL+L−1} where L is the REG bundle size, $i = 0,1,...,N_{REG}^{CORESET}/L - 1$, and $N_{REG}^{CORESET} = N_{RB}^{CORESET} N_{symb}^{CORESET}$ is the number of REGs in the CORESET
- CCE j consists of REG bundles {f(6j/L),f(6j/L+1),...,f(6j/L+6/L−1)} where f(•) is an interleaver For non-interleaved CCE-REG mapping, L = 6 and f(x) = x.
For interleaved CCE-to-REG mapping, $L \in \{2,6\}$ for $N_{symb}^{CORESET} = 1$ and $L \in \{N_{symb}^{CORESET}, 6\}$ for $N_{symb}^{CORESET} \in \{2,3\}$. The interleaver is defined by $f(x) = (rC + c + n_{shift}) \mod (N_{REG}^{CORESET}/L)$
$x = cR + r$
$r = 0,1,...,R - 1$
$c = 0,1,...,C - 1$
$C = N_{REG}^{CORESET} /(LR)$
where $R \in \{2,3,6\}$.

Figure 6:
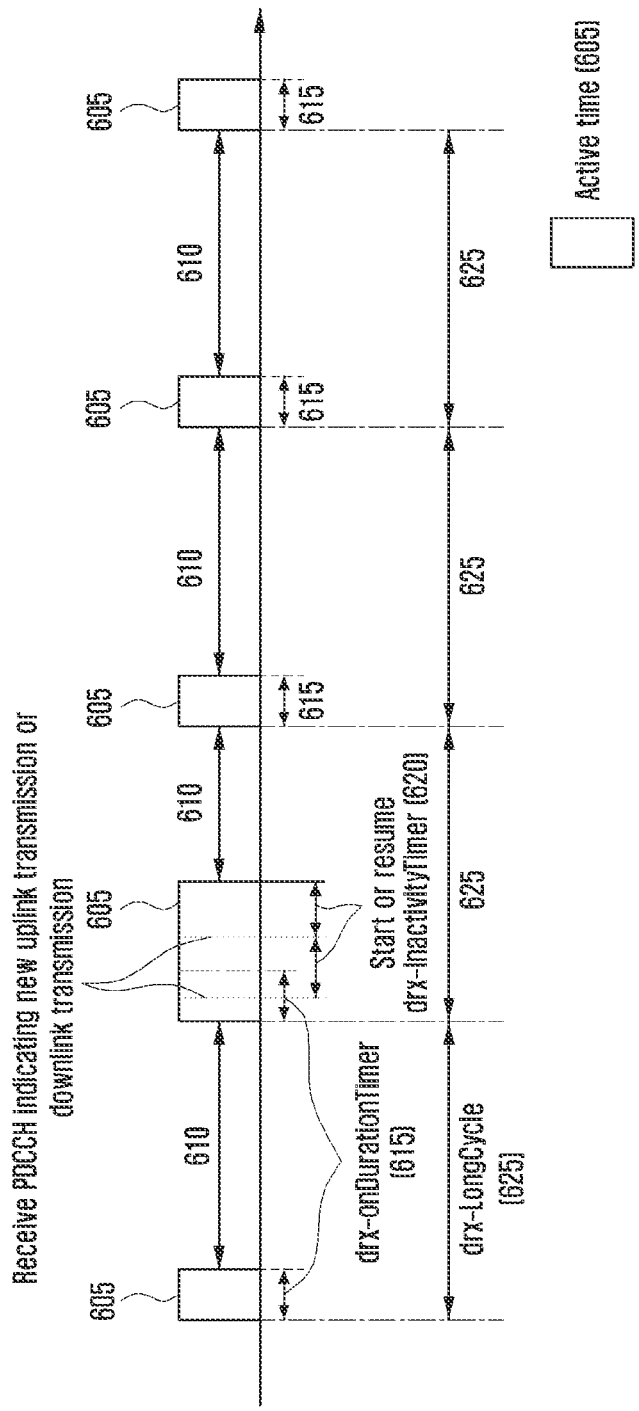
FIG. 6 is a diagram illustrating an example of a DRX operation.

FIG. 6 is a diagram for illustrating discontinuous reception (DRX).

Discontinuous reception (DRX) is an operation in which a terminal using a service discontinuously receives data in an RRC connected state in which a radio link is established between a base station and the terminal. When DRX is applied, the terminal turns on a receiver at a specific time point to monitor a control channel, and if there is no data received for a certain period of time, the terminal turns off the receiver to reduce power consumption of the terminal. The DRX operation may be controlled by a MAC layer device, based on various parameters and timers.

Referring to FIG. 6, an active time 605 is a time during which the terminal wakes up in each DRX cycle and monitors a PDCCH. The active time 605 may be defined as follows.

drx-onDurationTimer or drx-InactivityTimer or drx-RetransmissionTimerDL or drx-RetransmissionTimerUL or ra-ContentionResolutionTimer is running;
a Scheduling Request is sent on PUCCH and is pending; or
a PDCCH indicating a new transmission addressed to the C-RNTI of the MAC entity has not been received after successful reception of a random-access response for the random-access preamble not selected by the MAC entity among the contention-based random-access preamble drx-onDurationTimer, drx-InactivityTimer, drx-RetransmissionTimerDL, drx-RetransmissionTimerUL, ra-ContentionResolutionTimer and the like, are timers, the values of which are configured by the base station, and have a function of configuring the terminal to monitor the PDCCH when a predetermined condition is satisfied.

drx-onDurationTimer 615 is a parameter for configuration of a minimum time in which the terminal is awake in the DRX cycle. drx-InactivityTimer 620 is a parameter for configuration of an additional time during which the terminal is awake when a PDCCH indicating new uplink transmission or downlink transmission is received 630. drx-RetransmissionTimerDL is a parameter for configuration of a maximum time during which the terminal is awake to receive downlink retransmission in a downlink HARQ procedure. drx-RetransmissionTimerUL is a parameter for configuration of a maximum time during which the terminal is awake to receive an uplink retransmission grant in an uplink HARQ procedure. drx-onDurationTimer, drx-InactivityTimer, drx-RetransmissionTimerDL and drx-RetransmissionTimerUL may be configured to, for example, time, the number of subframes, the number of slots, and the like. ra-ContentionResolutionTimer is a parameter for monitoring of the PDCCH in a random-access procedure.

An inActive time 610 is a time configured so that the PDCCH is not monitored or a time configured so that the PDCCH is not received during the DRX operation, and the inActive time 610 may be a time remaining after excluding the Active time 605 from the total time for performing of the DRX operation. If the terminal does not monitor the PDCCH during the Active time 605, the terminal may enter a sleep or inActive state so as to reduce power consumption.

A DRX cycle refers to a cycle in which the terminal wakes up and monitors the PDCCH. That is, the DRX cycle refers to a time interval from after the terminal monitors the PDCCH to a time point of monitoring a subsequent PDCCH, or an occurrence cycle of on-duration. There are two types of the DRX cycle, which are a short DRX cycle and a long DRX cycle. The short DRX cycle may be optionally applied.

A long DRX cycle 625 is a longer cycle among the two DRX cycles configured for the terminal. While operation in the long DRX, the terminal starts drx-onDurationTimer 615 again at a time point at which the long DRX cycle 625 has elapsed from a start point (e.g., a start symbol) of drx-onDurationTimer 615. When operating in the long DRX cycle 625, the terminal may start drx-onDurationTimer 615 in a slot subsequent to drx-SlotOffset in a subframe satisfying Equation 2 below. Here, drx-SlotOffset refers to a delay before starting drx-onDurationTimer 615. drx-SlotOffset may be configured with, for example, time, the number of slots, and the like.

$$[(SFN \times 10) + subframe\ number] modulo(drx\text{-}Long\text{-}Cycle) = drx\text{-}StartOffset \qquad [\text{Equation 2}]$$

In drx-LongCycleStartOffset, the long DRX cycle 625 and drx-StartOffset may be used to define a subframe in which the long DRX cycle 625 is to start. drx-LongCycleStartOffset may be configured with, for example, time, the number of subframes, the number of slots, and the like.

Hereinafter, a method of configuring a TCI state for a PDCCH (or PDCCH DMRS) in the 5G communication system will be described in detail.

The base station is able to configure and indicate a TCI state for a PDCCH (or PDCCH DMRS) via appropriate signaling. The TCI state is for announcement of a quasi co-location (QCL) relationship between a PDCCH (or PDCCH DMRS) and another RS or channel, wherein QCL of a certain reference RS antenna port A (reference RS #A) and another target RS antenna port B (target RS #B) (QCLed) indicates that the terminal is allowed to apply some or all of large-scale channel parameters estimated at antenna port A to channel measurement from the antenna port B. It may be necessary to associate different parameters when channel measurement is performed, depending on situations, such as 1) time tracking affected by an average delay and a delay spread, 2) frequency tracking affected by a Doppler shift and a Doppler spread, 3) radio resource management (RRM) affected by an average gain, and 4) beam management (BM) affected by a spatial parameter. Accordingly, NR supports four types of QCL relationships as shown in Table 15 below.

TABLE 15

| QCL type | Large-scale characteristics |
|---|---|
| A | Doppler shift, Doppler spread, average delay, delay spread |
| B | Doppler shift, Doppler spread |
| C | Doppler shift, average delay |
| D | Spatial Rx parameter |

The spatial RX parameter may refer to some or all of various parameters, such as angle of arrival (AoA), power angular spectrum (PAS) of AoA, angle of departure (AoD), PAS of AoD, transmission/reception channel correlation, transmission/reception beamforming, and spatial channel correlation. The QCL relationship is configurable for the terminal via RRC parameter TCI-State and QCL-Info, as shown in Table 16 below. Referring to Table 16, the base station may configure one or more TCI states for the terminal so as to inform up to two QCL relationships (qcl-Type1 and qcl-Type2) for an RS, i.e., a target RS, referring to IDs of the TCI states. Each piece of QCL information (QCL-Info) included in each TCI state includes a serving cell index and a BWP index of a reference RS indicated by corresponding QCL information, a type and an ID of the reference RS, and a QCL type as shown in Table 15.

TABLE 16

```
TCI-State :: =              SEQUENCE {
tci-StateId                 TCI-StateId,
(ID of corresponding TCI state)
qcl-Type1                   QCL-Info,
(QCL information of first reference RS of RS (target RS) referring to
corresponding TCI state ID)
qcl-Type2                   QCL-Info
   OPTIONAL, -- Need R
(QCL information of second reference RS of RS (target RS) referring to
corresponding TCI state ID)
...
}
QCL-Info :: =               SEQUENCE {
cell            ServCellIndex           OPTIONAL, --
Need R
(Serving cell index of reference RS indicated by corresponding QCL
information)
bwp-Id          BWP-Id                  OPTIONAL, --
Cond CSI-RS-Indicated
(BWP index of reference RS indicated by corresponding QCL information)
referenceSignal             CHOICE {
csi-rs                      NZP-CSI-RS-ResourceId,
ssb                         SSB-Index
(either CSI-RS ID or SSB ID indicated by corresponding QCL
information)
},
either CSI-RS ID or SSB ID indicated by corresponding QCL information
...
}
```

Figure 7:
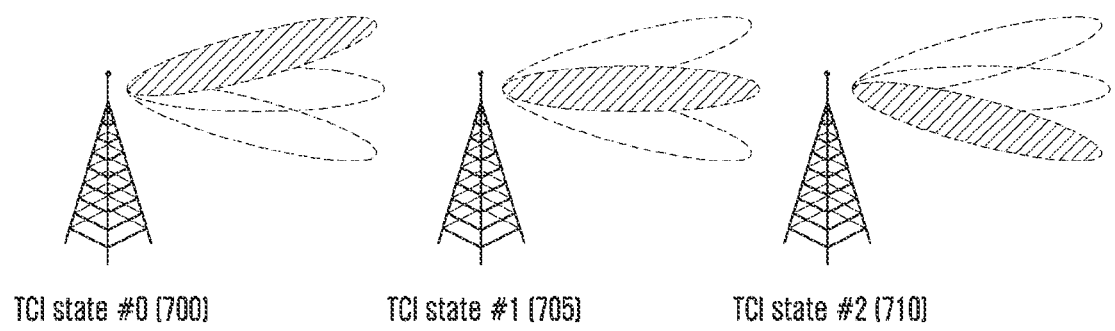
FIG. 7 is a diagram illustrating an example of base station beam allocation according to a TCI state configuration.

FIG. 7 is a diagram illustrating an example of base station beam allocation according to & TCI state configuration. Referring to FIG. 7, a base station may transfer information on: N different beams to a terminal via N different TCI states. For example, if N=3 as shown in FIG. 7, the base station may cause the qcl-Type2 parameters included in three TCI states 700, 705, and 710 to be associated with CSI-RSs or SSBs corresponding to different beams and to be configured to QCL type D, so as to announce that antenna ports referring to the different TCI states 700, 705, or 710 are associated with different spatial Rx parameters, i.e., different beams (reception beams).

Specifically, TCI state combinations applicable to a PDCCH DMRS antenna port are as shown in Table 17 below. In Table 17, a fourth row is a combination assumed by the terminal before RRC configuration and cannot be configured after the RRC configuration.

TABLE 17

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | | |
| 4 | SS/PBCH Block | QCL-TypeA | SS/PBCH Block | QCL-TypeD |

Figure 8:
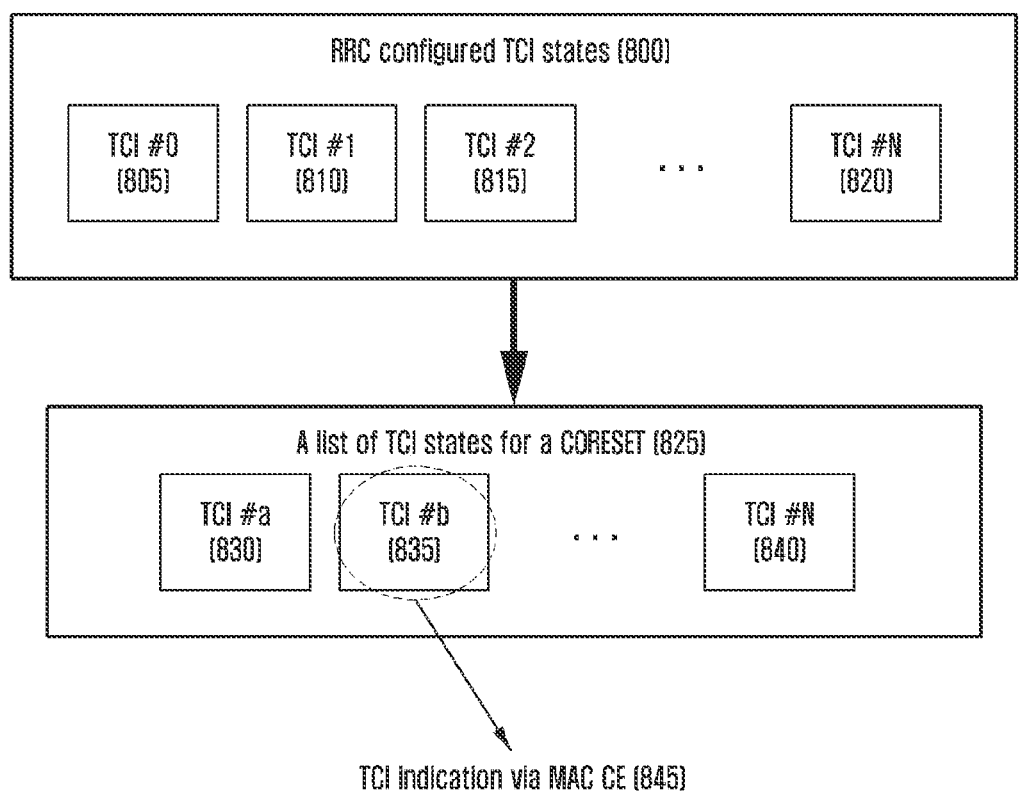
FIG. 8 is a diagram illustrating an example of a method of TCI state assignment for a control channel.

In the NR system, a hierarchical signaling method as illustrated in FIG. 8 is supported for dynamic allocation of a PDCCH beam. FIG. 8 is a diagram illustrating an example of signaling for allocation of a PDCCH beam by a base station. Referring to FIG. 8, a base station may configure N TCI states 805, 810, . . . , 820 for a terminal via RRC signaling 800, and some of these may be configured 825 as TCI states for a CORESET (via RRC signaling). The base station may then indicate 845 one of the TCI states 830, 835, and 840 for CORESET to the terminal via MAC CE signaling. Thereafter, the terminal receives a PDCCH, based on beam information included in the TCI state indicated by the MAC CE signaling.

The base station may configure one or multiple TCI states for the terminal with respect to a specific control resource set, and may activate one of the configured TCI states via a MAC CE activation command. For example, {TCI state #0, TCI state #1, TCI state #2} may be configured as TCI states for control resource set #1, and the base station may transmit, to the terminal via the MAC CE, a command for activating to assume TCI state #0 as the TCI state for control resource set #1. The terminal may correctly receive a DMRS of the corresponding control resource set according to QCL information within the activated TCI state, based on the activation command for the TCI state, which is received via the MAC CE.

For a control resource set (control resource set #0) having an index configured to 0, if the terminal has failed to receive a MAC CE activation command for the TCI state of control resource set #0, the terminal may assume that a DMRS transmitted in control resource set #0 has been QCLed with an SS/PBCH block identified during an initial access or a non-contention-based random-access that is not triggered by a PDCCH command.

Figure 9:
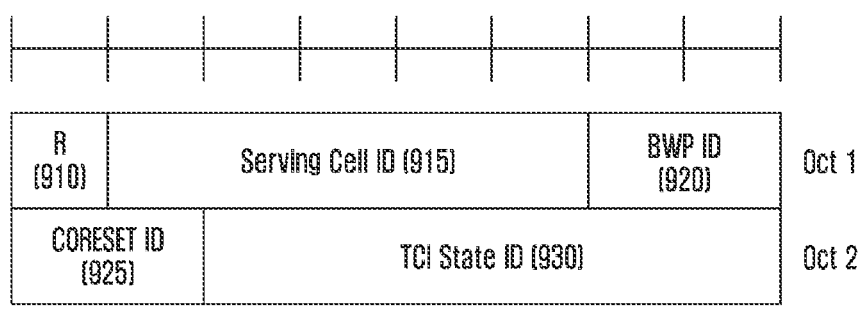
FIG. 9 is a diagram illustrating a TCI indication MAC CE signaling structure for a control channel DMRS.

For a control resource set (control resource set #X) having an index configured to a value other than 0, if the terminal has failed to be configured with a TCI state for control resource set #X, or has been configured with one or more TCI states but has failed to receive a MAC CE activation command to activate one of the TCI states, the terminal may assume that a DMRS transmitted in control resource set #X has been QCLed with an SS/PBCH block identified during initial access. FIG. 9 is a diagram illustrating a TCI indication MAC CE structure for the PDCCH DMRS.

Referring to FIG. 9, the TCI indication MAC CE for the PDCCH DMRS is configured by, for example, 2 bytes (16 bits), and includes a reserved bit 910 of 1 bit, a serving cell ID 915 of 5 bits, a BWP ID 920 of 2 bits, a CORESET ID 925 of 2 bits, and a TCI state ID 930 of 6 bits.

Figure 10:
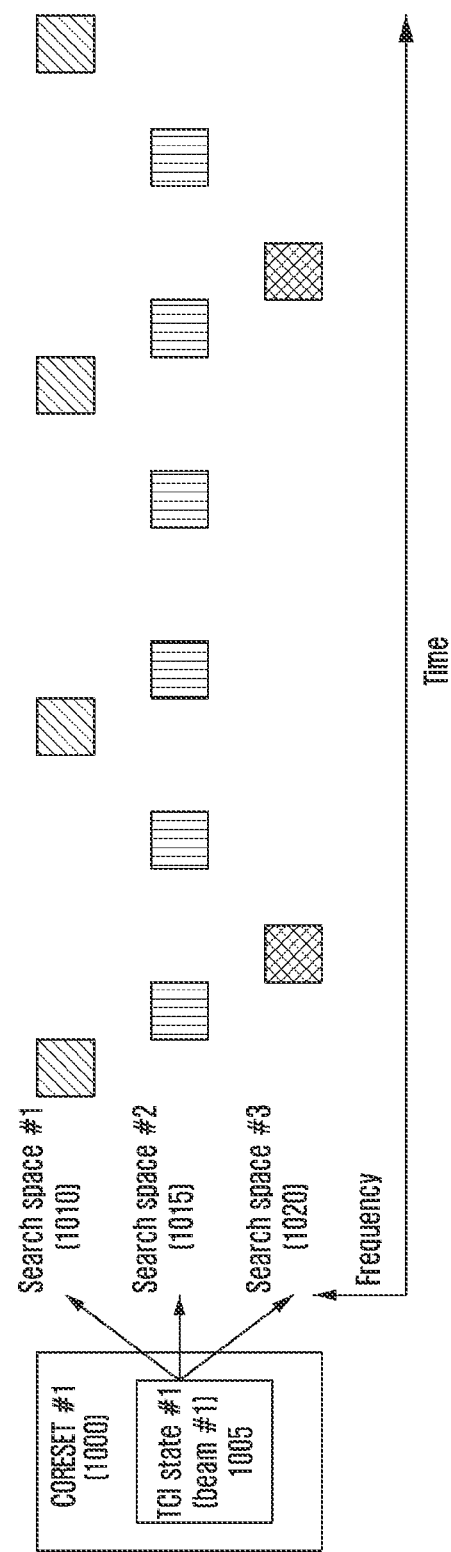
FIG. 10 is a diagram illustrating an example of a control channel configuration.

FIG. 10 is a diagram illustrating an example of CORESET and search space beam configurations according to the description above.

Referring to FIG. 10, a base station may indicate 1005 one of TCI state lists included in a CORESET configuration 1000 via MAC CE signaling. Then, until another TCI state is indicated for a corresponding CORESET via another MAC CE signaling, the terminal considers that the same QCL information (beam #1) 1005 is applied to all of one or more search spaces (search space #1 1010, search space #2 1015, and search space #3 1020) connected to the CORESET.

According to the aforementioned PDCCH beam allocation method, it is difficult to indicate a beam change faster than a MAC CE signaling delay, and since the same beam is collectively applied to all CORESETs regardless of search space characteristics, flexible PDCCH beam may be difficult. Hereinafter, embodiments of the disclosure provide a more flexible PDCCH beam configuration and operation method. Hereinafter, the description of embodiments of the disclosure, several distinct examples are provided for convenience of the description, but the examples are not mutually exclusive and are applicable by appropriately combining with each other according to situations.

Hereinafter, an embodiment of the disclosure will be described in detail with the accompanying drawings. Hereinafter, an embodiment of the disclosure will be described using the 5G system as an example, but the embodiment of the disclosure may also be applied to other communication systems having a similar technical background or channel type. For example, LTE or LTE-A mobile communication and a mobile communication technology developed after the 5G system may be included therein. Therefore, an embodiment of the disclosure may be applied to other communication systems via some modifications without departing from the scope of the disclosure, according to determination by those skilled in the art.

In addition, in description of the disclosure, when it is determined that a detailed description of a related function or configuration may unnecessarily obscure the subject matter of the disclosure, the detailed description thereof will be omitted. Terms to be described hereinafter are terms defined in consideration of functions in the disclosure, and may vary depending on intention or usage of users or operators. Therefore, the definition should be based on contents throughout the specification.

Hereinafter, in description of the disclosure, higher layer signaling may be signaling corresponding to at least one of the following signaling types or a combination of one or more thereof.

Master information block (MIB)
System information block (SIB) or SIB X (X=1, 2, . . . )
Radio resource control (RRC)
Medium access control (MAC) control element (CE)

In addition, L1 signaling may be signaling corresponding to at least one of signaling methods using the following physical layer channels or signaling types or a combination of one or more thereof.

Physical downlink control channel (PDCCH)
Downlink control information (DCI)
Terminal-specific (UE-specific) DCI
Group common DCI
Common DCI
Scheduling DCI (e.g., DCI used for scheduling downlink or uplink data)
Non-scheduling DCI (e.g., DCI not for scheduling of downlink or uplink data)
Physical uplink control channel (PUCCH)
Uplink control information (UCI)

Hereinafter, a transmission and reception point (TRP, a transmission/reception time point or a transceiver) refers to a device capable of transmitting a signal to or receiving a signal from a terminal, one or more TRPs may include a base station, and it is possible that each TRP corresponds to a base station or one TRP includes multiple base stations. In the following description, a TRP and a base station are interchangeable.

Hereinafter, CORESET transmission or SS transmission, control channel transmission, and PDCCH transmission may be understood as DCI transmission in a corresponding CORESET, DCI transmission in a corresponding SS, and DCI transmission on a PDCCH. A DCI search or detection may be interchangeably used with PDCCH monitoring (DCI reception based thereon).

<First Embodiment> TCI Configuration Method for Cooperative Communication

The proposed first embodiment is a method of, when one or more PDCCH transmissions on a CORESET are performed, indicating whether one or more base stations participate in corresponding transmissions of the CORESET, and includes a method in which an indicator including information of a beam used for transmission of a base station or reception of a receiver (hereinafter, used interchangeably with a terminal) is included in a CORESET. Hereinafter, a DL TCI may be a transmission beam (or a spatial domain transmission filter used for transmission) used for base station transmission or may be an indicator indicating that a signal has been transmitted using the same method used for another signal (e.g., a tracking reference signal (TRS or CSI-RS for tracking), an SSB, a CSI-RS, etc., may be indicated as a reference RS) transmitted (by a base station) using a specific transmission beam. Alternatively, the DL TCI may be information indicating a conventional QCL type. A UL TCI may be an indicator indicating information of a beam (or a spatial domain reception filter used for reception) used when a terminal receives a signal, an indicator indicating that the terminal uses the same reception method as that for spatial relation information of the terminal, which has been used for receiving any downlink signal (e.g., a TRS, an SSB, a CSI-RS, etc.), an indicator indicating that the terminal uses the same transmission method as that for spatial relation information of the terminal, which has been used for transmitting any uplink signal (e.g., a PUCCH, a PUSCH, an SRS, etc.), or information indicating a conventional QCL type.

Configuration information of a control channel resource configuration for cooperative communication may enable the terminal to separately receive different TRPs by configuring the following identifiers for each CORESET via higher layer signaling. CORESETPoolIndex may be included in CORESET configuration information as shown in Table 9. For example, CORESETPoolIndex indicators may be classified as follows with respect to the following two TCI configurations.

CORESETPoolIndex=1: TCI #A
CORESETPoolIndex=2: TCI #B

If CORESET PoolIndex is configured to 1 in CORESET #1, the terminal may recognize that a TRP corresponding to TCI #A participates (i.e., the TRP corresponding to TCI #A transmits a PDCCH) in control channel transmission on CORESET #1, and if CORESET PoolIndex is configured to 2 in CORESET #2, the terminal may recognize that a TRP corresponding to TCI #b participates (i.e., the TRP corresponding to TCI #b transmits a PDCCH) in control channel transmission in CORESET #2.

Hereinafter, a TCI configuration method which is more flexible and has less overhead is proposed.

[Method 1]: Multiple TCIs (method of configuring one or more DL TCIs) with CORESETpoolIndex=3, . . . , N The proposed method 1 is a method of indicating one or more TCI states to one CORESET. As an example, CORESETPoolIndex n may be connected to multiple (DL) TCI states as shown below, and when this method is used, a receiver may recognize, via a CORESETPoolIndex indicator, that one base station or different TRPs are used for control channel transmission, or may recognize whether one or more TRPs are used for control channel transmission on one CORESET.

CORESETPoolIndex=1: TCI #A
CORESETPoolIndex=2: TCI #B
CORESETPoolIndex=3: TCI #A, #B, . . . , #N

[Method 2]: Joint TCI (method of configuring DL+UL TCIs) with CORESETpoolIndex=3, . . . , N Proposed method 2 is a method of jointly indicating a downlink TCI state and an uplink TCI state, while concurrently indicating that a specific joint TCI has been configured in a CORESET. When this method is used, a receiver may recognize, via a CORESETPoolIndex indicator, that one base station or different TRPs are used for control channel transmission, or may recognize, at once, a (transmission) beam of a control channel transmitted in one TRP and an uplink TCI or QCL information used when receiving the corresponding control channel.

CORESETPoolIndex=1: TCI #A
CORESETPoolIndex=2: TCI #B
CORESETPoolIndex=3: DL TCI #A+UL TCI (or QCL) #C
CORESETPoolIndex=4: DL TCI #B+UL TCI (or QCL) D For example, during TCI state configuration via higher layer signaling, the DL TCI and the UL TCI corresponding to the joint TCI may have the same reference RS antenna port. In this case, information of only one reference RS antenna port may be included in DL TCI and UL TCI configuration information, and it is thus possible to reduce overhead according to the TCI configuration. Alternatively, the DL TCI and the UL TCI may be configured to have different RS antenna ports.

[Method 3] Multiple/joint TCI (method of configuring one or more DL+UL TCIs) with CORESETpoolIndex=3, . . . , N Proposed method 3 is a method of jointly indicating a downlink TCI state and an uplink TCI state, while concurrently indicating that one or more joint TCI indicators are configured in one CORESET. When this method is used, a receiver may recognize, via a CORESETPoolIndex indicator, that one base station or different TRPs are used for control channel transmission, or may use, for receiving one CORESET, a (transmission) beam of a control channel transmitted in one or more TRPs and uplink TCI or QCL information used when receiving the control channel.

CORESETPoolIndex=1: TCI #A
CORESETPoolIndex=2: TCI #B
CORESETPoolIndex=3: DL TCI #A+UL TCI (or QCL) #C, DL TCI #B+UL TCI (or QCL) #D, . . .
. . .
CORESETPoolIndex=N: DL TCI #C+UL TCI (or QCL) #F, DL TCI #D+UL TCI (or QCL) #G, . . .

The proposed method is a method of concurrently indicating TCI information for transmission and TCI or QCL information for reception, and according to the method, one or more pieces of reception beam information and downlink channel information referred to by when receiving a control channel on one CORESET can improve reception performance.

[Method 4] A combination of the aforementioned methods is possible, and the disclosure includes a combination of one or more methods. For example, if methods 1 and 2 are combined, the following configurations are possible.

CORESETPoolIndex=1: TCI #A
CORESETPoolIndex=2: TCI #B
CORESETPoolIndex=3: TCI #A, #B
CORESETPoolIndex=4: DL TCI #A+UL TCI #C
CORESETPoolIndex=5: DL TCI #B+UL TCI #D When this method is used, the base station is able to selectively operate joint, multiple, or single TCI without reconfiguring an RRC signal.

<Second Embodiment> Method of CORESET and SS Configuration for PDCCH Reception for Cooperative Communication The second embodiment of the disclosure is a method of configuring PDCCH resources by using one or more CORESETs and one or more SSs for repetitive PDCCH transmission for cooperative communication. According to the proposed method, one or more TCIs or joint TCIs are assigned to one or more CORESETs or one or more SSs to enable a terminal to receive one or more PDCCHs having the same payload from one or more TRPs with little overhead, so that reception reliability of a control channel can be improved or signal blocking that may occur instantaneously between each TRP and the terminal can be overcome. The second embodiment will be described below with reference to FIG. 11A, FIG. 11B, FIG. 11C, FIG. 11D, FIG. 11E and FIG. 11F.

<2-1st Embodiment> One CORESET and One Search Space (SS)

Figure 11A:
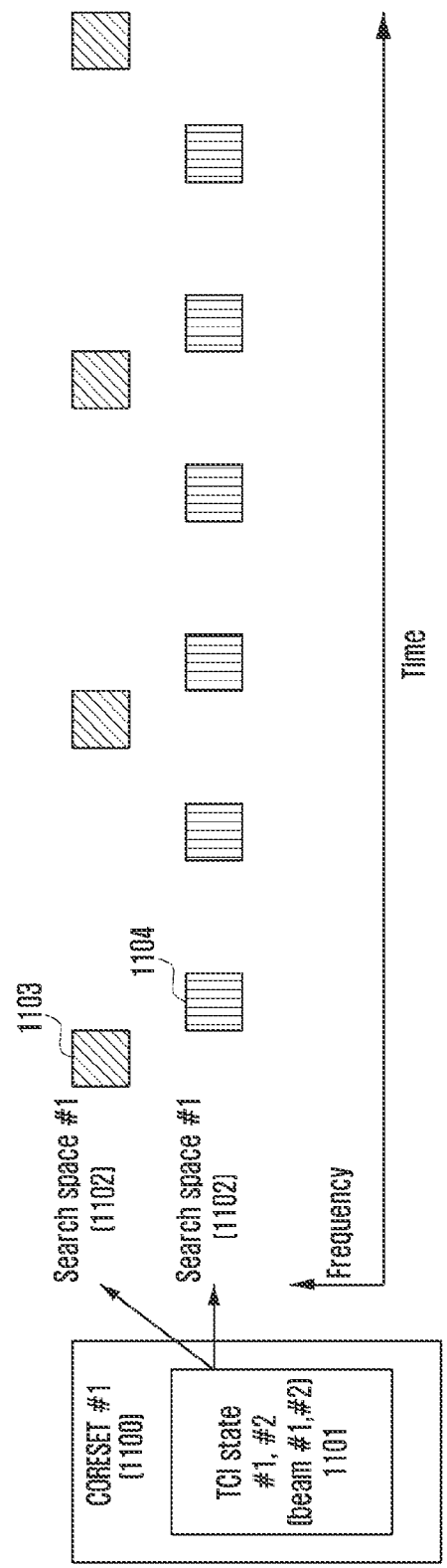
FIG. 11A is a diagram illustrating an example of a 2-1st embodiment of the disclosure.

FIG. 11A is a diagram illustrating an example of the 2-1st embodiment of the disclosure. The 2-1st embodiment of the disclosure corresponds to a case in which one CORESET 1100 and one SS 1102 are configured, and a control channel is transmitted in one or more TRPs, (for example, multiple TCIs 1101 are configured for CORESET 1100 and may correspond to beam #1 and beam #2 respectively and correspond to respective TRPs). According to the method proposed in the embodiment, a terminal receives a PDCCH transmitted from one or more TRPs in one CORESET while the number of CORESETs or SSs which can be operated by the terminal is not increased. In this case, the method described below may be performed. An example of a case in which two TCIs are configured is described below, but this may be generalized to a case in which n TCIs are configured (n≥2).

[Method 1] Two-Slot Offset Method

Method 1 is a method of including one or more pieces of slot offset information in SS configuration information having the same SS index. Slot offset (or monitoringSlotPeriodicityAndOffset) information indicates a period and an offset of a slot to be monitored by an SS, and this may be interpreted as referring to a time resource of the SS. If multiple pieces of slot offset information are configured, multiple respective periods having one SS index and an SS having an offset may be configured. Here, one or more pieces of TCI information may be configured for one CORESET.

For example, in a case where SS configuration information includes two pieces of slot offset information, if a first offset is offset A and a second offset is offset B, control channel transmission on SS 1103 configured by offset A may refer to PDCCH transmission via first TCI information and control channel transmission on SS 1104 configured by offset B may refer to PDCCH transmission via second TCI information. Therefore, the terminal may attempt to receive a PDCCH transmitted in a first TRP on a first CORESET and a first SS corresponding to offset A (based on TCI #1), and may also attempt to receive a PDCCH transmitted in a second TRP on a first CORESET and a first SS corresponding to offset B (based on TCI #2). The terminal expects that DCI of the same payload may be transmitted based on different offsets in order to improve reception performance of PDCCHs transmitted in different TRPs. This method may be indicated by adding monitoringSlotPeriodicityAndOffset_v16 as shown in Table 18 below.

TABLE 18

```
Search Space :: =                    SEQUENCE {
Identity of the search space. SearchSpaceId = 0 identifies the SearchSpace
configured via PBCH (MIB) or ServingCellConfigCommon.
searchSpaceId                        SearchSpaceId,
(Search space identifier)
controlResourceSetId                 ControlResourceSetId,
(Control resource set identifier)
monitoringSlotPeriodicityAndOffset   CHOICE {
(Monitoring slot level period)
sl1                                  NULL,
sl2                                  INTEGER (0..1),
sl4                                  INTEGER (0..3),
sl5                                  INTEGER (0..4),
sl8                                  INTEGER (0..7),
sl10                                 INTEGER (0..9),
sl16                                 INTEGER (0..15),
sl20                                 INTEGER (0..19)
}     monitoringSlotPeriodicityAndOffset_v16 CHOICE {
(Monitoring slot level period)
sl1                                  NULL,
sl2                                  INTEGER (0.1),
sl4                                  INTEGER (0..3),
sl5                                  INTEGER (0..4),
sl8                                  INTEGER (0..7),
sl10                                 INTEGER (0..9),
sl16                                 INTEGER (0..15),
sl20                                 INTEGER (0..19)
}
                                     OPTIONAL,
duration (monitoring duration)              INTEGER (2..2559)
monitoringSymbolsWithinSlot                 BIT STRING (SIZE (14))
(Monitoring symbol in slot)                 OPTIONAL,
nrofCandidates                              SEQUENCE {
(The number of PDCCH candidates for each aggregation level)
aggregationLevel1                           ENUMERATED {n0, n1, n2, n3,
n4, n5, n6, n8},
```

TABLE 18-continued

| | |
|---|---|
| aggregationLevel2 | ENUMERATED {n0, n1, n2, n3, n4, n5, n6, n8}, |
| aggregationLevel4 | ENUMERATED {n0, n1, n2, n3, n4, n5, n6, n8}, |
| aggregationLevel8 | ENUMERATED {n0, n1, n2, n3, n4, n5, n6, n8}, |
| aggregationLevel16 | ENUMERATED {n0, n1, n2, n3, n4, n5, n6, n8} |
| } | |
| searchSpaceType | CHOICE { |
| (Search space type) | |
| Configures this search space as common search space (CSS) and DCI formats to monitor. | |
| common | SEQUENCE { |
| (Common search space) | |
| } | |
| ue-Specific | SEQUENCE { |
| (UE-specific search space) | |
| Indicates whether the UE monitors in this USS for DCI formats 0-0 and 1-0 or for formats 0-1 and 1-1. | |
| formats | ENUMERATED (formats0-0-And-1-0, formats0-1-And-1-1}, |
| ... | |
| } | |

[Method 2] Odd/even duration method. Method 2 is a method of indicating a resource to which each TCI is to be applied, via duration information of SS configuration information having the same SS index. A duration may be understood as the number of consecutive slots (or a specific reference time resource) in which an SS lasts, wherein one or more pieces of TCI information may be configured for one CORESET. As an example, a case in which a duration is 1 slot and a case in which a duration exceeds 1 slot may be separately considered. If the duration is 1 slot, the terminal may assume that a PDCCH is transmitted only in one TRP by using only a first TCI among multiple TCIs, and if the duration is greater than 1, the terminal may assume that there is a PDCCH to be transmitted in a first TRP by using a first TCI in odd slots, and may assume that there is a PDCCH to be transmitted in a second TRP by using a second TCI in even slots, so as to attempt to restore the PDCCH. Therefore, the terminal may attempt to receive the PDCCH, which is transmitted in the first TRP, with respect to a first CORESET and a first SS corresponding to an odd slot among slots indicated by duration information, and the terminal may also attempt to receive the PDCCH, which is transmitted in the second TRP, with respect to a first CORESET and a first SS corresponding to an even slot among the slots indicated by the duration information. The terminal expects that DCI of the same payload may be transmitted in different slots in order to improve reception performance of PDCCHs transmitted in different TRPs.

[Method 3] Bitmap Separation Method

Method 3 is a method of indicating SS configuration information having the same SS index via bitmap information of symbols in slot. The bitmap (or monitoringSymbolsWithinSlot) information of symbols in slot may be information indicating a symbol included in an SS in a slot to be monitored, which is configured via slot offset information. Here, one or more pieces of TCI information may be configured for one CORESET. As an example, 14 symbols, which may be indicated by the bitmap information of symbols in slot, may be divided into a first half of symbol per slot and a second half of symbol per slot. If the number of bits indicated by 1 is smaller than a CORESET duration (information indicating a time interval of CORESET in units of symbols), the terminal may assume that a PDCCH is transmitted only in one TRP by using only a first TCI among multiple TCIs, and if the number of bits indicated by 1 is greater than the CORESET duration, the terminal may assume that there is a PDCCH transmitted in a first TRP corresponding to TCI #1 in a symbol indicated by a first half bit, and may assume that there is a PDCCH transmitted in a second TRP corresponding to TCI #2 in a symbol indicated by a second half bit, so as to attempt to restore the PDCCH.

Therefore, the terminal also attempt to receive the PDCCH, which is transmitted in the first TRP, with respect to a first CORESET and a first SS (by using TCI #1) in a symbol corresponding to a first half of symbols indicated by information of symbols in slot, and the terminal may also attempt to receive the PDCCH, which is transmitted in the second TRP, with respect to a first CORESET and a first SS (by using TCI #2) in a symbol corresponding to a second half of the symbols indicated by the information of symbols in slot. The terminal expects that DCI of the same payload may be transmitted in different symbols in order to improve reception performance of PDCCHs transmitted in different TRPs. When different search regions are generated in one slot, the terminal expects that the number of times of blind decoding (BD) is uniformly or equally assigned in the two search regions.

[Method 4] Method of Using Different Methods Jointly

The 2-1st embodiment proposed by the disclosure includes a method of selectively using the methods independently or in combination.

<2-2nd Embodiment> More than One CORESET and One Search Space (SS)

Figure 11B:
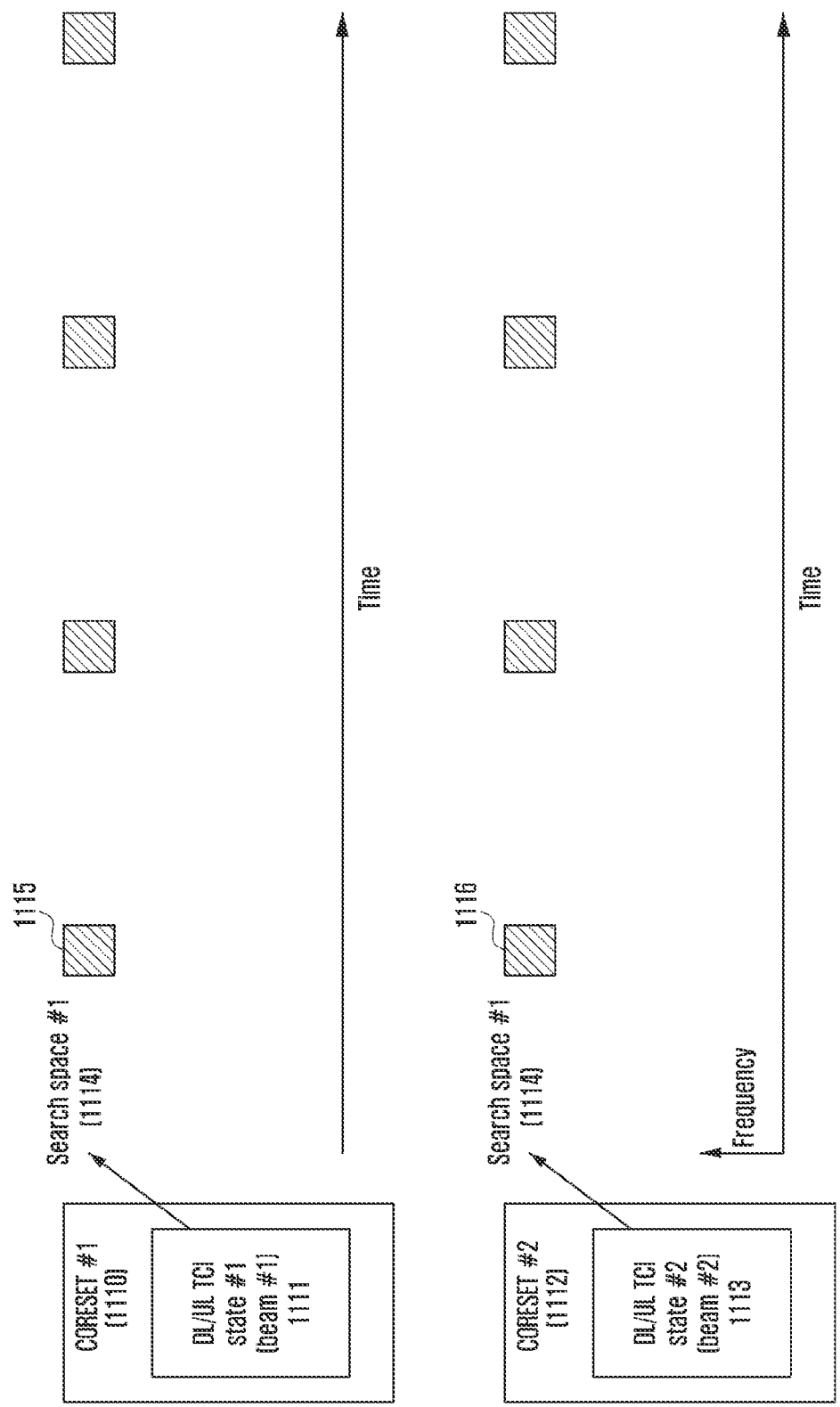
FIG. 11B is a diagram illustrating an example of a 2-2nd embodiment of the disclosure.

FIG. 11B is a diagram illustrating an example of the 2-2nd embodiment of the disclosure. In the 2-2nd embodiment of the disclosure, one or more CORESETs 1110 and 1112 and one SS 1114 are configured, and a control channel is transmitted in one or more TRPs. According to the method proposed in the embodiment, when a CORESET or an SS which can be operated by the terminal overlap, the terminal may concurrently receive, in one or more CORESETs, PDCCHs transmitted from one or more TRPs by using TCIs configured for the respective CORESETs. Based on the proposed 2-2nd embodiment, the base station may transmit a PDCCH for cooperative communication without increasing the number of SSs configured for the terminal.

[Method 1] Non-Overlapped with Joint TCI

Method 1 is a method in which, when joint TCIs 1111 and 1113 are respectively configured in one or more CORESETs, and if the respective CORESETs do not overlap in the frequency domain, the terminal receives one or more PDCCHs in one or more TRPs. In a case of the proposed method 1, the terminal may be configured with one or more CORESETs 1110 and 1112 having the same SS 1114 indicated in each CORESET, in which case, the method may be applied to a case where the terminal is configured to assume the same QCL type D for each TCI via the joint TCI or QCL information is not configured. That is, the terminal may receive the PDCCH in configured resources 1115 and 1116 by using the same reception beam, and/or may receive the PDCCH in each of the resources 1115 and 1116 according to an UL TCI according to each configured joint TCI. According to the disclosure, the terminal may attempt to restore different PDCCHs having the same payload transmitted from the resources 1115 and 1116 according to different CORESETs at the same time point. If the terminal is able to perform a soft combining function of the control channel, it is assumed that the terminal may combine two different PDCCHs having the same payload at a bit level, a symbol level, or a Log-Likelihood Ratio (LLR) level. The base station and the terminal should perform configuration so that the number of BDs for different CORESETs does not exceed the number of BDs allowed in one slot, and as an example, it may be assumed that the numbers of BDs for 1115 and 1116 are equally or uniformly arranged.

[Method 2] Partially Overlapped with Joint TCI

Method 2 is a method in which, when joint TCIs are respectively configured in one or more CORESETs, and if the respective CORESETs partially overlap in the frequency domain, the terminal receives one or more PDCCHs in one or more TRPs. In the case of the proposed method 2, the terminal is configured with one or more CORESETs having the same SS indicated in the respective CORESETs, in which case, if the terminal is configured to make an assumption of the same QCL type D for each TCI via the joint TCI, or if QCL information is not configured, the terminal may attempt to restore different PDCCHs having the same payload transmitted from different CORESETs at the same time.

In addition, the terminal may receive the PDCCH, based on single frequency network (SFN) transmission using two pieces of TCI information at the same time for the frequency domain where CORESETs overlap each other, and in this case, the number of BDs of the PDCCH may be additionally assigned to the overlapping frequency domain. For example, the terminal assumes both the TCI configurations 1111 and 113 of CORESET #1 and CORESET #2 with respect to the domain where CORESETs overlap, and performs additional blind decoding.

If the terminal is able to perform a soft combining function of the control channel, it is assumed that the terminal may combine two different PDCCHs having the same payload at a bit level, a symbol level, or an LLR level. The base station and the terminal should perform configuration so that the number of BDs of different CORESETs does not exceed the number of BDs allowed in one slot, and with respect to a case where each TCI is assumed (e.g., the frequency domain in which CORESETs do not overlap each other) and a combination assuming two TCIs at the same time (e.g., a domain in which CORESETs overlap), it may be assumed that the number of BDs may be equally or uniformly assigned.

[Method 3] Full Overlapped with Joint TCI

Method 3 is a method in which, when joint TCIs are configured in one or more CORESETs, respectively, and if the respective CORESETs fully overlap in the frequency domain, the terminal receives one or more PDCCHs in one or more TRPs. In the case of the proposed method 3, the terminal is configured with one or more CORESETs having the same SS indicated in the respective CORESETs, in which case, if the terminal is configured to make an assumption of the same QCL type D for each TCI via the joint TCI, or if QCL information is not configured, the terminal may attempt to restore different PDCCHs having the same payload transmitted from different CORESETs at the same time point and in the same frequency domain. In addition, with respect to the frequency domain where CORESETs overlap each other, the terminal may receive the PDCCH, based on SFN transmission using two pieces of TCI information at the same time, and in this case, the number of BDs of the PDCCH may be additionally assigned.

If the terminal is able to perform a soft combining function of the control channel, it is assumed that the terminal may combine two different PDCCHs having the same payload at a bit level, a symbol level, or an LLR level. The base station and the terminal should perform configuration so that the number of BDs for different CORESETs does not exceed the number of BDs allowed in one slot, and with respect to a case where each TCI is assumed and a combination assuming two TCIs at the same time, it may be assumed that the number of BDs may be equally or uniformly assigned. As an example, when resource regions, in which the PDCCH needs to be monitored according to SS #1 1114 of CORESET #1 1110 and CORESET #2 1112, fully overlap each other, the terminal may monitor the overlapped resource regions, based on TCI #1 1111, TCI #2 1113, and the simultaneous assumption of TCI #1 1111 and TCI #2 1113, and in this case, the number of BDs may be equally assigned in each case.

[Method 4] Multiple TCIs with Full Overlapped TCI

Figure 11C:
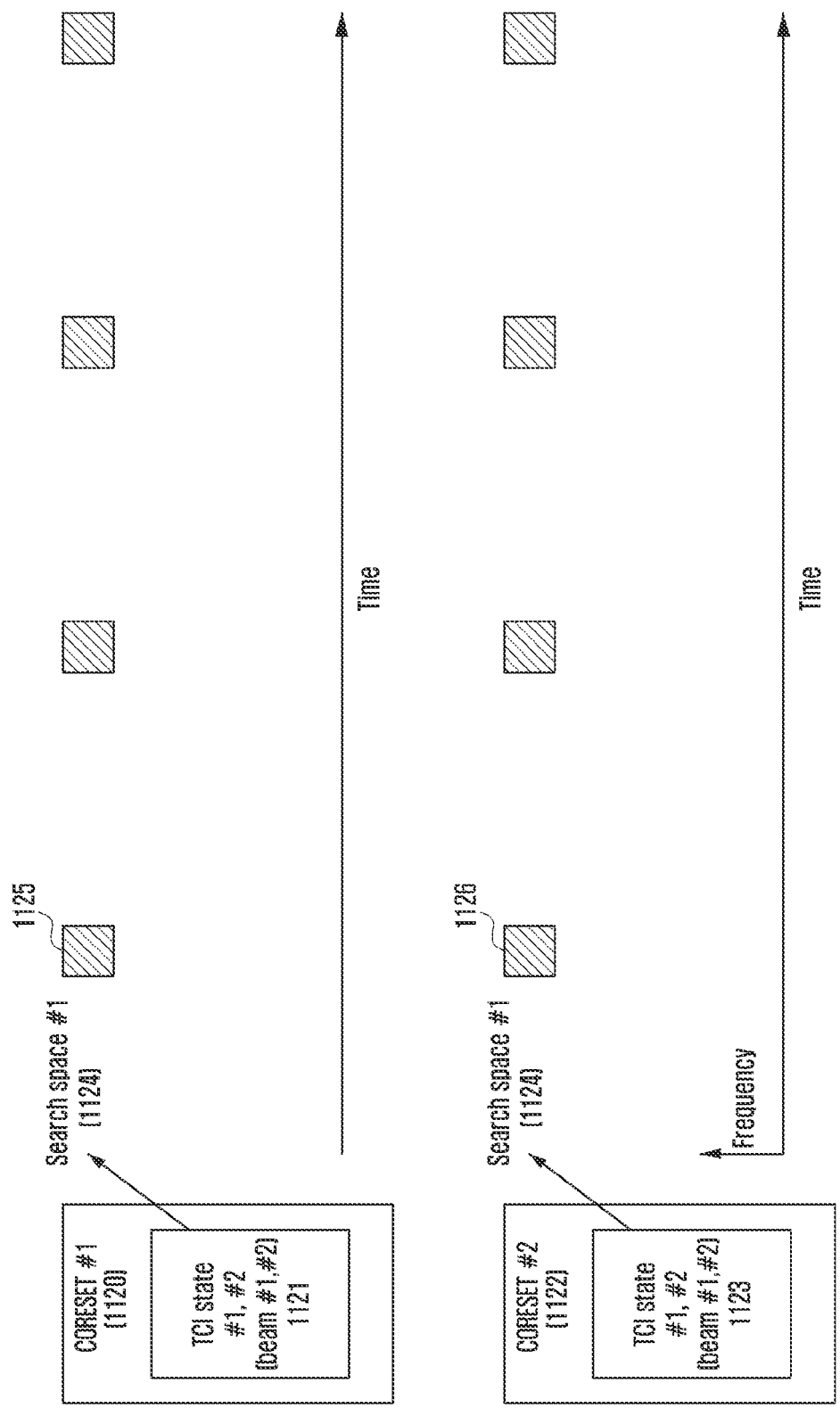
FIG. 11C is a diagram illustrating an example of method 4 of the 2-2nd embodiment.

FIG. 11C is a diagram illustrating an example of method 4 of the 2-2nd embodiment. Method 4 is a method in which, when multiple TCIs 1121 and 1123 are configured in one or more CORESETs 1120 and 1122, respectively, and if the respective CORESETs do not overlap in the frequency domain, the terminal receives one or more PDCCHs in one or more TRPs. In the case of the proposed method 4, the terminal is configured with one or more CORESETs having the same SS (SS #1) 1124 indicated in the respective CORESETs, in which case, if the terminal is configured to make an assumption of the same QCL type D for each TCI via the joint TCI, or QCL information is not configured, when there are CORESETs having the same information of multiple TCIs among the one or more CORESETs, the terminal may attempt to restore different PDCCHs having the same payload from different CORESETs at the same time point and in the same frequency domain. In this case, in a resource 1125 corresponding to a small CORESET index, the terminal attempts to restore the PDCCH through each TCI (for example, in the resource 1125, the terminal attempts to receive the PDCCH by using each of TCI #1 and TCI #2) by assuming that the PDCCH is transmitted in a single TRP, and in a resource 1126 corresponding to a large CORESET index, the terminal may attempt to restore the PDCCH by concurrently applying one or more TCIs (TCI #1 and TCI #2) by assuming that PDCCH is transmitted on the assumption of SFN from among multiple TRP transmission methods.

<2-3rd Embodiment> One CORESET and More than One Search Space (SS)

Figure 11D:
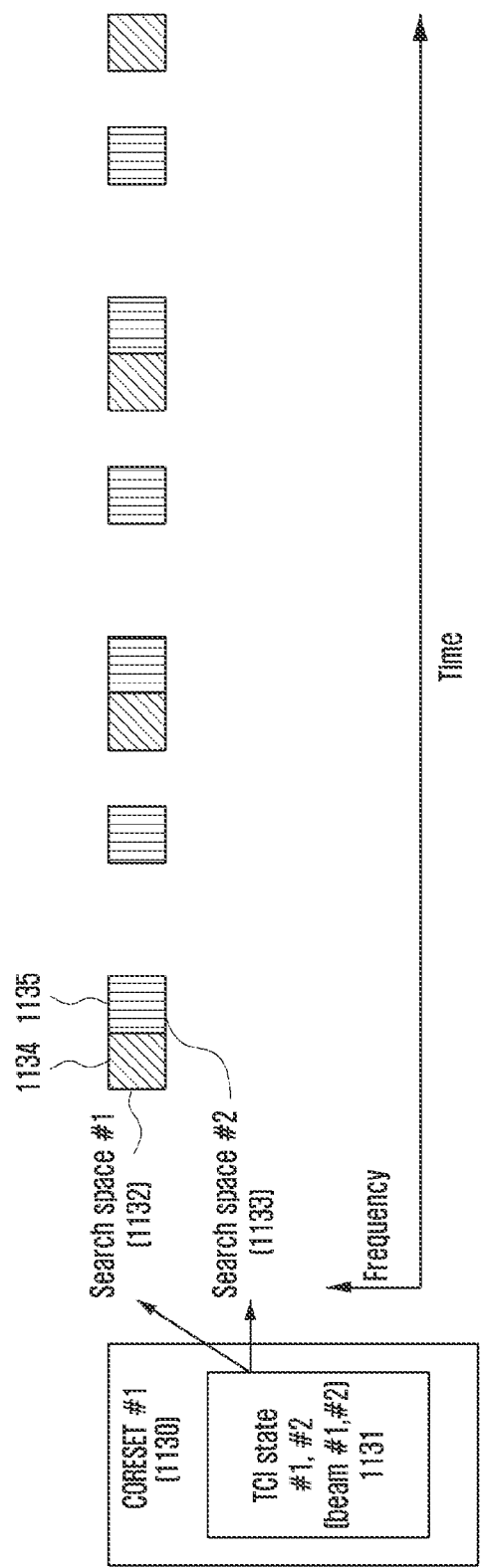
FIG. 11D is a diagram illustrating an example of a 2-3rd embodiment of the disclosure.

FIG. 11D is a diagram illustrating an example of the 2-3rd embodiment of the disclosure. In the 2-3rd embodiment of the disclosure, one or more SSs 1132 and 1133 are configured for one CORESET 1130, which corresponds to a case where a PDCCH is transmitted in one or more TRPs (this corresponds to each TCI indicated in reference numeral 1131). The proposed method is to configure one or more SSs connected to a CORESET of a specific CORESET index, and according to the proposed method, the terminal monitors PDCCHs transmitted in different TRPs in the SS connected to the same CORESET, and this method enables support of cooperative communication without increasing the number of operating CORESETs.

[Method 1] Non-Overlapped with Multiple TCIs

Method 1 is a method in which different SSs having the same associated CORESET index are configured with different periods or offsets so as not to overlap on the time axis. According to method 1, the terminal may receive a PDCCH by using a first TCI in an SS 1134 with an earliest slot where an SS exists from among configured SSs (SS #1 1132 and SS #2 1133), and may sequentially receive a PDCCH by applying a subsequent TCI in a subsequent SS 1135. As another example, the terminal may receive the PDCCH by using the first TCI in the SS (SS #1 1132) having a small SS index and may receive PDCCHs by applying subsequent TCIs in descending order of the SS indices (e.g., receiving the PDCCH using TCI #2 in SS #2 1133). As another example, the terminal may receive a PDCCH by using a first TCI in an SS having a low corresponding symbol index in a slot in which SSs exist, and the terminal may receive a PDCCH by sequentially applying another TCI in a subsequent SS. As another example, a TCI application order may be indicated in SS configuration information or CORESET configuration information.

The terminal may expect that different control channels with the same payload may be transmitted in different SSs connected to the same CORESET index, and if a corresponding control channel is retrieved, combining may be applied to PDCCHs received from respective SSs. The combining may be combining at a bit level, a symbol level, or an LLR level. If different SSs exist in one slot, it is expected that the terminal may attempt decoding for a control channel search equally or uniformly between different SSs. That is, if SS #1 1132 and SS #2 1133 exist in one slot, the number of BDs for SS #1 1132 and the number of BDs for SS #2 1133 may be equal.

[Method 2] Partially Overlapped with Multiple TCI

Method 2 is a method in which different SSs having the same CORESET index are configured with different periods or offsets so as to partially overlap on the time axis. Method 2 may be applied to a case in which, with respect to the terminal, QCL type D is identically configured or not configured for different SSs. The terminal may receive the PDCCH by using the first TCI (TCI #1) in the SS (SS #1 1134) with an early slot in which an SS exists from among one or more configured SSs, and then may receive a PDCCH by sequentially applying a subsequent TCI (e.g., receiving the PDCCH by using SS #2 1135 and TCI #2). In a case of resources in the overlapping time domain, the terminal may attempt to receive a control channel on assumption that a TCI corresponding to the overlapping region is concurrently applied.

As another example, the terminal may receive a control channel by using a first TCI in an SS having a small SS index, and may receive a control channel by applying a subsequent TCI in SS in a descending order of SS indices. As another example, the terminal may receive a PDCCH by using a first TCI in an SS having a low symbol index in a slot in which SSs exist, and the terminal may receive a control channel by sequentially applying another TCI. As another example, a TCI application order may be indicated in SS configuration information or CORESET configuration information.

The terminal may expect that different control channels with the same payload may be transmitted in different SSs connected to the same CORESET index, and if a corresponding control channel is retrieved, combining may be applied to PDCCHs received from respective SSs. The combining may be combining at a bit level, a symbol level, or an LLR level. If different SSs exist in one slot, it is expected that the terminal may equally or uniformly attempt decoding for a control channel search between different SSs and also in overlapping resource regions to which TCIs are concurrently applied. That is, if SS #1 1132 and SS #2 1133 exist in one slot, the number of BDs for SS #1 1132, the number of BDs for SS #2 1133, and the number of BDs for a region in which SS #1 1132 and SS #2 1133 overlap and TCI #1 and TCI #2 are concurrently applied may be equal.

[Method 3] Full Overlapped with Multiple TCI

Method 3 is a method in which different SSs having the same CORESET index are configured with different periods or offsets so as to overlap on the time axis. Method 3 may be applied to a case in which, with respect to the terminal, QCL type D is identically configured or not configured for different SSs. The configured SSs are overlapped, and the terminal may thus attempt to receive a control channel on assumption that a TCI corresponding to the overlapping resource region is concurrently applied. For example, the terminal receives the PDCCH by assuming that both TCI #1 and TCI #2, which need to be applied to SS #1 1132 and SS #2 1133, are applied. The terminal may attempt to receive the control channel by assuming that each TCI (TCI #1 or TCI #2) is applied. The terminal expects that an attempt for decoding for a control channel search may be equally or uniformly made between different SSs and in overlapping regions to which TCIs are concurrently applied. That is, the terminal may assign an equal number of BDs to cases of TCI #1, TCI #2, and concurrent application of TCI #1 and TCI #2, in the overlapping resource regions.

<2-4th Embodiment> More than One CORESET and More than One Search Space (SS)

Figure 11E:
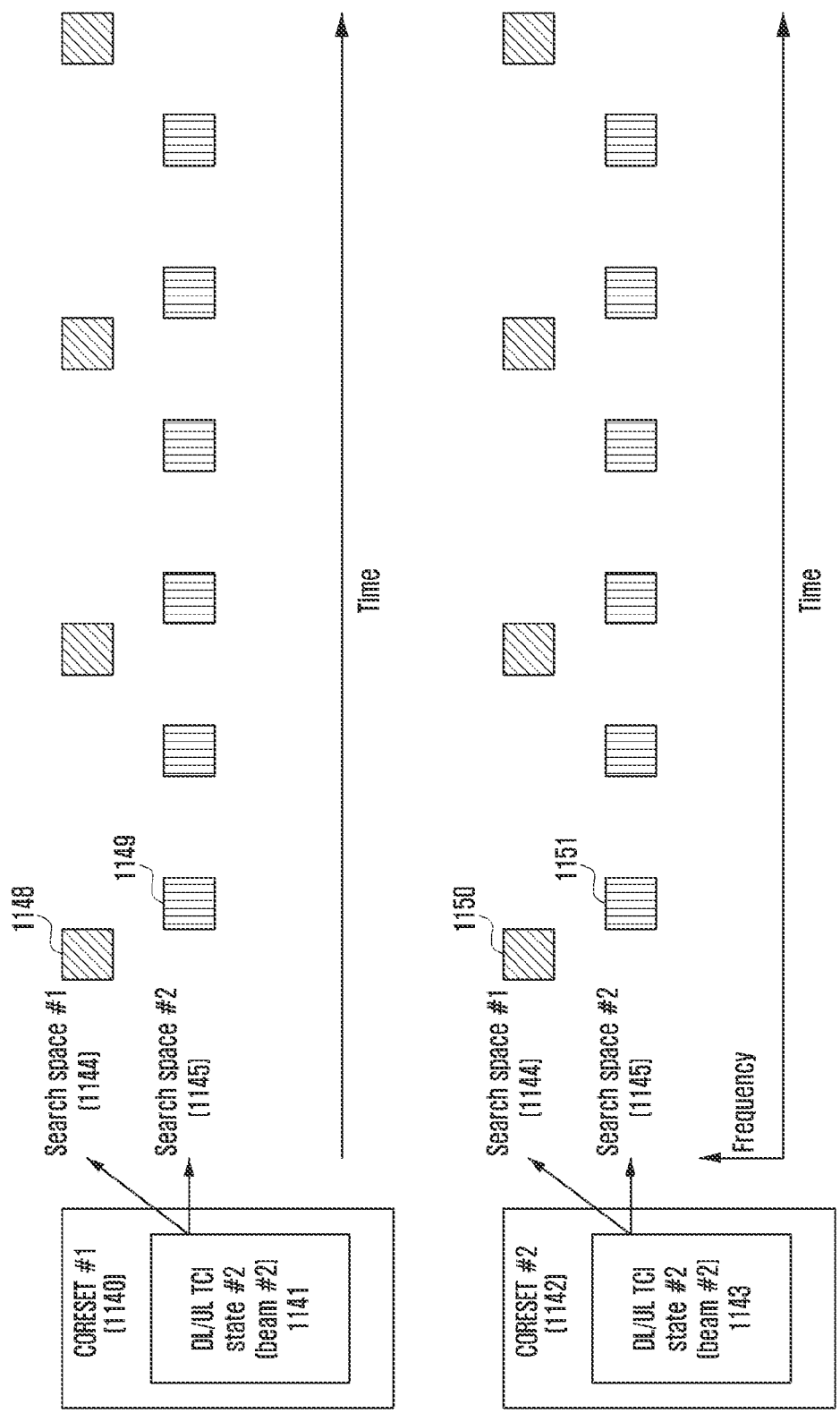
FIG. 11E is a diagram illustrating an example in which a joint TCI is configured in each CORESET according to a 2-4th embodiment of the disclosure.
Figure 11F:
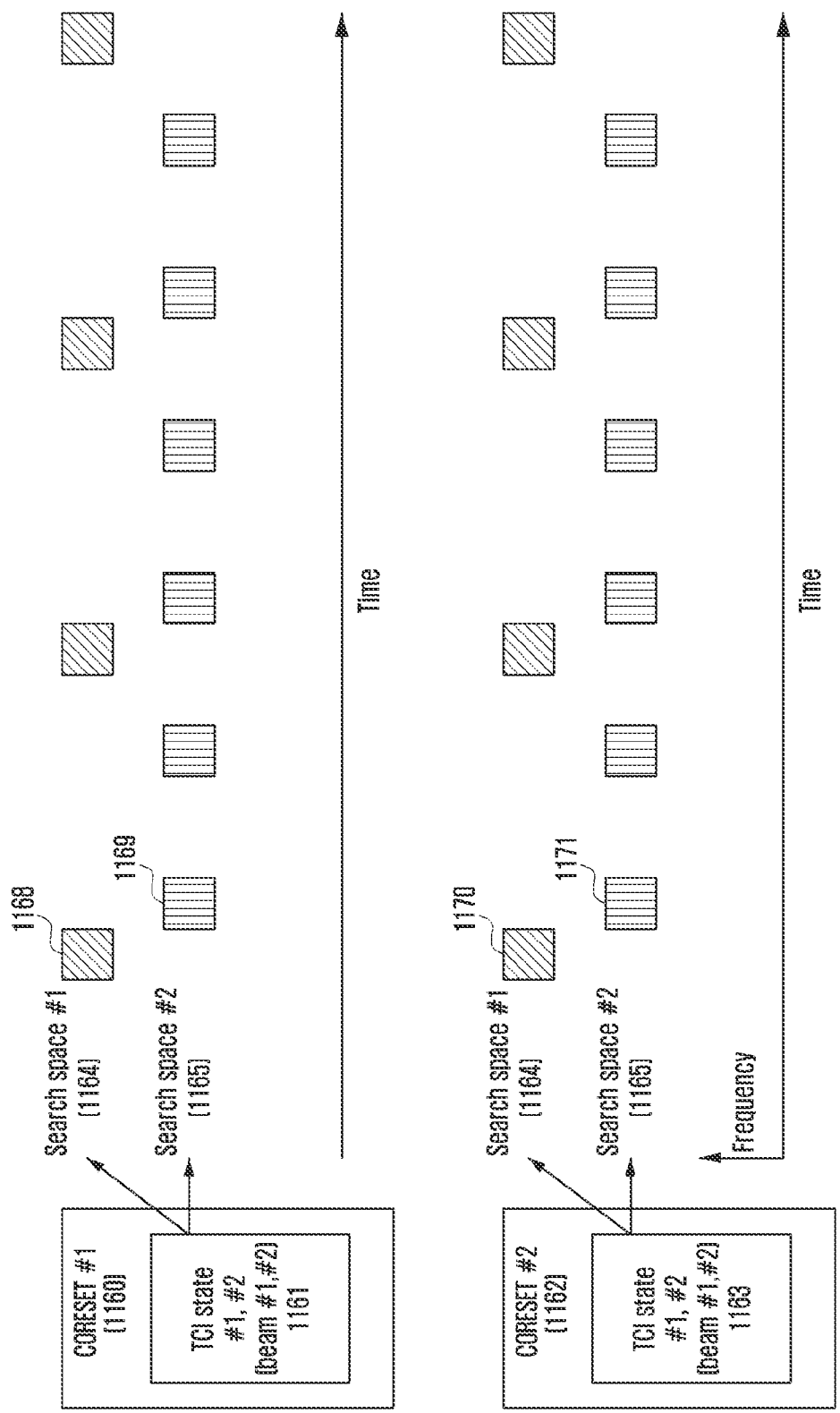
FIG. 11F is a diagram illustrating an example in which multiple TCIs are configured in each CORESET according to the 2-4th embodiment of the disclosure.

FIG. 11E and FIG. 11F are diagrams illustrating an example of the 2-4the embodiment according to the disclosure. The 2-4th embodiment of the disclosure corresponds to a case in which one or more CORESETs and one or more SSs are configured, and a control channel is transmitted in one or more TRPs. According to the proposed method, one or more SSs having the same index may be connected to one CORESET, and conversely, different CORESET indices may be connected in one SS.

[Method 1] Joint TCI

FIG. 11E is a diagram illustrating an example in which a joint TCI is configured in each CORESET according to the 2-4th embodiment of the disclosure. According to FIG. 11E, one or more CORESETs 1140 and 1142 may be configured, and one or more SSs 1144 and 1145 may be configured for each CORESET. If joint TCIs 1141 and 1143 are configured in the respective CORESETs, the terminal may search for a control channel via one or more CORESETs when receiving one SS. (for example, the terminal may receive PDCCHs from a resource 1148 according to CORESET #1 and a resource 1150 according to CORESET #2 with respect to SS #1 1144 by using TCI #1 and TCI #2, respectively), and when receiving an SS appearing subsequently in time, a control channel may also be searched for via one or more CORESETs at the same time (for example, the terminal may receive PDCCHs in a resource 1149 according to CORESET #1 and a resource 1151 according to CORESET #2 with respect to SS #2 1145 by using TCI #1 and TCI #2, respectively).

For example, when there are CORESET indices 1 and 2 1140 and 1142, there are SS indices 1 and 2 1144 and 1145, SS indices 1 and 2 are connected to CORESET index 1, and SS indices 1 and 2 are connected to CORESET index 2, in a case where SS #1 1144 appears in a slot or a symbol index earlier than SS #2 1145, if the terminal receives (using TCI #1) a control channel in SS #1, CORESET index 1 1148, and fails to receive (using TCI #2) a control channel in SS #1 of CORESET index 2 1150, the terminal may skip receiving a control channel in SS #2 of CORESET index 1 1149 (this is because the terminal may determine that transmission in TRP 1 corresponding to TCI #1 is blocked), and may reduce the number of attempts to receive a control channel by using the number of attempts to receive the control channel only in SS #2 of CORESET index 2 1151. That is, the terminal may not attempt to receive the control channel in a resource corresponding to a CORESET in which the control channel reception has already failed (that is, corresponding to a TCI in which the control channel reception has failed), and may allocate a part or all of the number of BDs allocated to the resource to a resource corresponding to the CORESET in which the control channel reception has been successful (that is, corresponding to the TCI in which control channel reception has been successful).

[Method 2] Multiple TCIs

FIG. 11F is a diagram illustrating an example in which multiple TCIs are configured in each CORESET according to the 2-4th embodiment of the disclosure. According to FIG. 11F, one or more CORESETs 1140 and 1142 may be configured, and one or more SSs 1144 and 1146 may be configured for each CORESET. When multiple TCIs 1161 and 1163 are connected to the respective CORESETs, the terminal may search for a control channel via one or more CORESETs when receiving one SS, and the terminal may receive a PDCCH by using a first TCI in a resource corresponding to a first SS and may receive a PDCCH y using a subsequent TCI in a resource corresponding to a subsequent SS. For example, it is assumed that TCI #1 and #2 1161 and 1163 are configured in CORESET #1 and #2 1160 and 1162, respectively, SSs 1164 and 1165 of SS indices 1 and 2 exist, SS indices 1 and 2 exist are connected to CORESET index 1, and SS indices 1 and 2 are connected to CORESET index 2. When SS #1 1164 is configured to be assigned to a slot or a symbol index earlier than SS #2 1165, for example, the terminal may attempt to receive a PDCCH by using TCI #1 in a resource 1168 corresponding to SS #1 of CORESET #1, the terminal may attempt to receive a PDCCH by using TCI #2 in a resource 1169 corresponding to SS #2 of CORESET #1, the terminal may attempt to receive a PDCCH by using TCI #1 in a resource 1170 corresponding to SS #1 of CORESET #2, and the terminal may attempt to receive a PDCCH by using TCI #2 in a resource 1171 corresponding to SS #2 of CORESET #2. For a method of determining a TCI applied to a combination of SS and CORESET, it is also possible to follow an indication made by an SS index, SS configuration information, or CORESET configuration information.

If the terminal receives a control channel by assuming TCI #1 in SS #1 of CORESET index 1 1168, but has failed to receive the control channel, the terminal may skip control channel reception in SS #1 of CORESET index 2 1170, and may assign the number of attempts to receive the control channel to transmission using TCI #2 in SS #2 of CORESET index 2 1171, so as to reduce the number of attempts to receive the control channel. That is, the terminal may not attempt to receive a control channel in a resource corresponding to a TCI in which control channel reception has already failed, and may allocate a part or all of the number of BDs, which has been assigned to the resource, to a resource corresponding to a TCI in which control channel reception has been successful.

[Method 3] Emulated TCI

If an emulated TCI is connected to a CORESET, the terminal may search for a control channel via one or more CORESETs when receiving one SS, and may attempt to receive a control channel by using TCIs configured in time resources corresponding to all SSs. For example, when TCI #1, #2, #3 are configured to each of CORESET #1 and CORESET #2, where TCI #3 is an emulation TCI of TCIs #1 and #2 (i.e., a TCI in which TCIs 1 and 2 are concurrently applied), it is assumed that SSs corresponding to SS indices 1 and 2 exist, SS indices 1 and 2 are connected to CORESET index 1, and SS indices 1 and 2 are connected to CORESET index 2. If SS #1 is configured to be assigned to a slot or a symbol index earlier than SS #2, the terminal assumes TCI #1, TCI #2, and TCI #3 in SS #1 of CORESET #1, and attempts to receive a control channel in each case. If the terminal succeeds in reception using TCI #3 in SS #1 of CORESET index 1, the terminal may skip an attempt to receive a control channel based on TCIs #1 and #2 in SS #2, and may attempt to receive a control channel in resource corresponding to SS #2 by using only TCI #3, so as to reduce the number of attempts to receive a control channel.

Figure 12A:
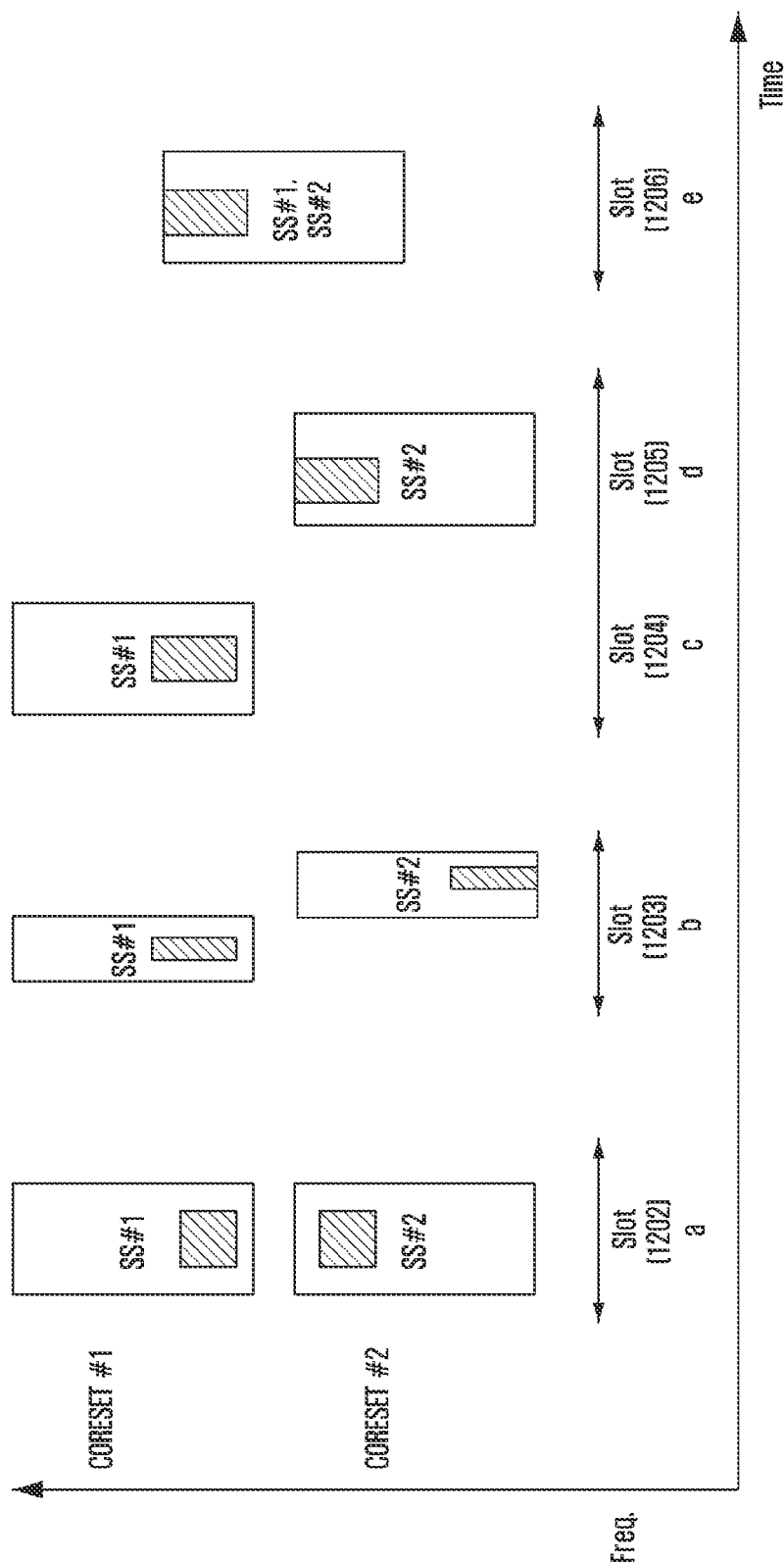
FIG. 12A is a diagram illustrating an example of a method of transmitting the same payload according to a third embodiment of the disclosure.

<Third Embodiment> PDCCH Repetition Configuration Method for Cooperative Communication The third embodiment of the disclosure describes a method of indicating to a terminal that DCI having the same payload is transmitted from different TRPs when PDCCH transmission is performed in one or more TRPs. That is, a method of transmitting the same payload and a method of indicating resource allocation are described. FIG. 12A is a diagram illustrating an example of a method of transmitting the same payload according to the third embodiment of the disclosure. Descriptions with reference to FIG. 12A are provided as follows. A base station may configure, for a terminal, how the same PDCCH payload is transmitted in one or more TRPs and, specifically, the method may be one of methods 1 to 5 described below. The configuration information may be transmitted via higher layer signaling, and when the terminal reports its capability for receiving a control channel to the base station, the indication may be indicated based on the terminal capability reported by the terminal.

[Method 1] Repetition in FDM

Proposed method 1 is to indicate that, as in a 1202, the base station may transmit different PDCCHs, in which one or more TRPs have the same payload, in different frequency domains of the same symbol, the same slot, overlapping symbols, overlapping slots, or partially overlapping symbols. The terminal having received this configuration information searches for, by assuming a TCI of different TRP transmission, the same DCI in CORESETs or SSs configured in different frequency domains at the same time, and when the same DCI is retrieved, the terminal may perform combining on two pieces of detected DCI at a symbol level, an LLR level, or a soft bit level so as to improve signal restoration performance. When the corresponding configuration is performed, the terminal may equally assign the number of BDs to different SSs or CORESETs.

[Method 2] TDM Intra Slot Repetition

Proposed method 2 is a method of indicating that, as in b 1203, the base station may transmit different PDCCHs, in which one or more TRPs have the same payload, to different symbols (non-overlapping symbols) within the same slot. According to method 2, one or more PDCCHs may carry the same DCI in the slot and may be transmitted in different TRPs, in which case, the number N1 of repetition transmissions may be indicated together. In this case, it is assumed that the terminal may attempt to restore PDCCHs transmitted in different TRPs in different symbols, and a case in which two TRPs concurrently transmit the same PDCCH does not occur. When the same DCI is retrieved in different symbols, the terminal is able to perform combining on two pieces of detected DCI at a symbol level, an LLR level, or a soft bit level so as to improve signal restoration performance. When the corresponding configuration is performed, the terminal may equally assign the number of BDs to different SSs or CORESETs in the slot.

[Method 3] TDM Inter Slot Repetition

Proposed method 3 is a method of indicating that, as in c 1204 and d 1205, different PDCCHs, in which one or more TRPs have the same payload, may be transmitted in different slots. One or more PDCCHs may carry the same DCI for each slot, and may be transmitted in different TRPs, in which case, the number N2 of repetition transmissions may be indicated together. In this case, it is assumed that the terminal may attempt to restore PDCCHs transmitted in different TRPs in different slots, and a case in which two TRPs concurrently transmit the same PDCCH does not occur. When the same DCI is retrieved in different slots, the terminal is able to perform combining on two pieces of detected DCI at a symbol level, an LLR level, or a soft bit level so as to improve signal restoration performance.

[Method 4] Single-Frequency Network (SFN)

Proposed method 4 is a method of indicating that, as in e 1206, different PDCCHs, in which one or more TRPs have the same payload, may be transmitted by overlapping in the same symbol and at the same frequency position. The terminal having received this configuration information may search for the same DCI in the CORESET or SS configured in the same frequency domain at the same time by assuming TCIs of different TRP transmissions or assuming that two TCIs are applied at the same time. When the corresponding configuration is performed, with respect to assumption of different TCIs or reception when two TCIs are applied at the same time, the terminal may equally assign the number of BDs.

[Method 5] Mix Support of Methods 1, 2, 3, and 4

Proposed method 5 is a method for mix support of the aforementioned methods. For example, when methods 1 and 2 are mixed, the base station may indicate that multiple TRPs may transmit different PDCCHs including the same DCI in two frequency domains, and may indicate that repetition transmission may occur in the same slot at the same time. The methods proposed in the disclosure are optional and independently applicable, and a combination of one or more methods is also applicable.

Figure 12B:
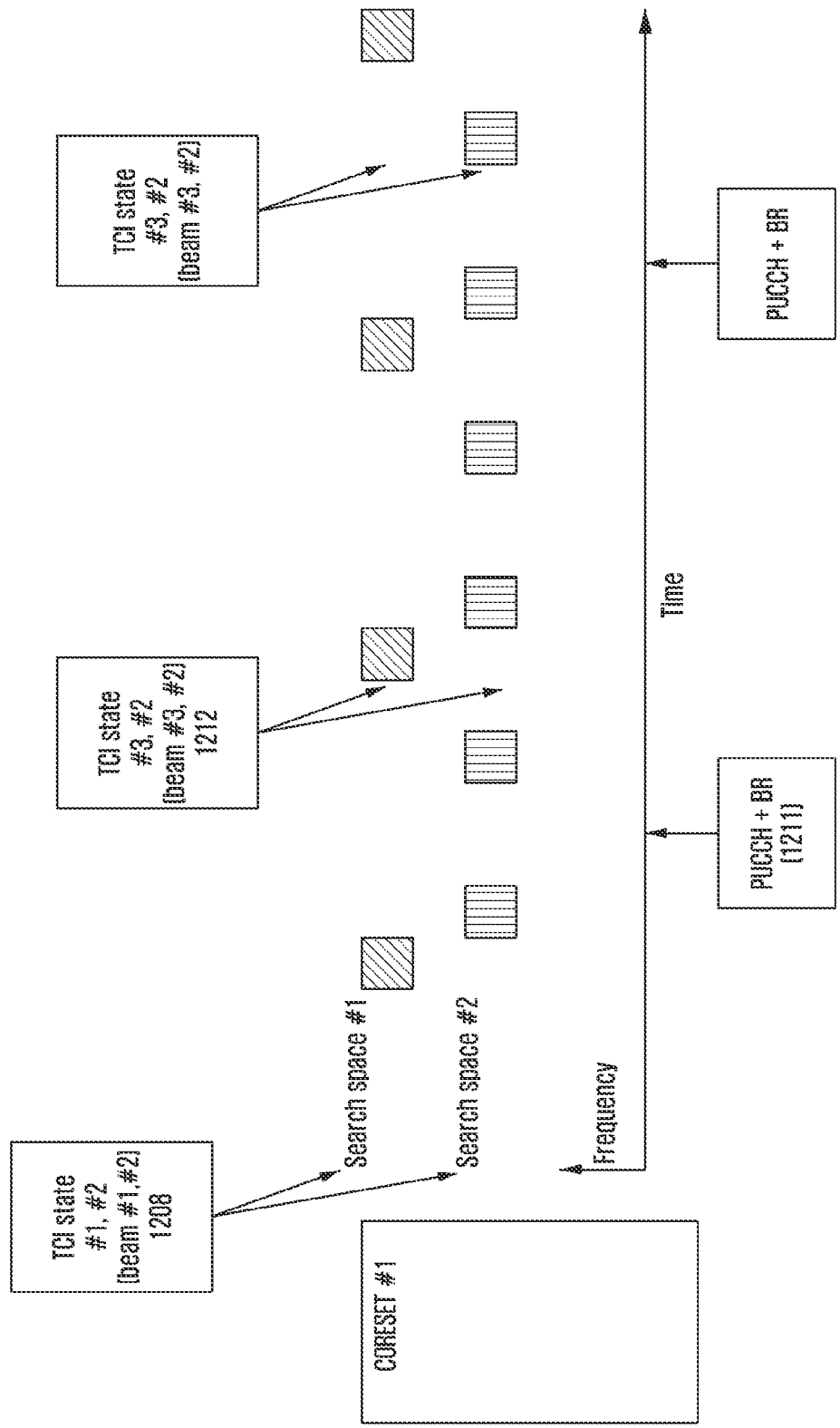
FIG. 12B is a diagram illustrating an example of a fourth embodiment.

<Fourth Embodiment> TCI State Update Method Via Beam Recovery for Cooperative Communication The fourth embodiment of the disclosure is a method of transferring, to the base station, whether a TCI state used for reception needs to be updated, based on a PDCCH reception result. FIG. 12B is a diagram illustrating an example of the fourth embodiment. Descriptions with reference to FIG. 12B are provided as follows.

[Method 1] One PDCCH-One PDSCH-Two HAQR ACK Based

Proposed method 1 is a method in which, when each of two TRPs separately transmits the same control channel, and different control channels indicate the same PDSCH, the terminal transfers, to the base station, whether the PDSCH is successfully received and whether beam recovery is required. According to method 1, two HARQ-ACK bits may be assigned to one PDSCH, a reception result of the PDSCH may indicate NACK and may be to feed back to update TCI states of both TRPs if the two HARQ-ACK bits transmitted on the PUCCH are "00", a reception result of the PDSCH may indicate ACK and may be to feed back to update a TCI state of a first TRP in a case of "01", a reception result of the PDSCH may indicate ACK and may be to feed back to update a TCI state of a second TRP in a case of "10", and a reception result of the PDSCH may indicate ACK and may indicate that no TCI state update is required in a case of "11". However, when the terminal receives PDCCHs by using TCIs #1 and #2 and feeds back 00 on the PUCCHs, it is difficult to determine whether PDSCH reception has failed due to an inappropriate beam configuration or due to another reason, so that it is also possible for the terminal to perform a link adaptation procedure (e.g., HARQ retransmission in which MCS is changed, etc.) without changing a TCI state. Accordingly, whether PDSCH reception is successful is determined by performing an OR operation on the HARQ-ACK bits, and a position of 0 among each bit may convey whether a TCI update of the corresponding TRP is required. Although this example has been described with respect to two TRPs, expansion using the same method is also possible in a case of two or more TRPs.

[Method 2] One PDCCH-One PDSCH-One HARQ ACK-One BR Indicator Based

Proposed method 2 is a method for, when each of two TRPs separately transmits the same control channel, and each control channel indicates the same PDSCH, concurrently transferring whether the PDSCH is successfully received and whether beam recovery. Method 2 is a method of assigning one HARQ-ACK bit to one PDSCH and additionally assigning one bit for a beam recovery request. For example, an MSB may indicate whether PDSCH reception is successful (ACK or NACK), 0 in a case of LSB may feed back that the update of the TCI state of the first TRP is required, and 1 in the LSB may feed back that the update of the TCI state of the second TRP is required. Accordingly, based on the HARQ_ACK bits received through the PUCCH, the base station determines, via the MSB, whether reception of the PDSCH is successful, and determines, via the LSB, whether the TCI update of the TRP is required. According to the method, it is not allowed to request to update two TRPs at the same time, but requests for beam recovery and the success or failure of a data channel may be made at the same time.

[Method 3] Two BR Indicator Based

Proposed method 3 is a method of concurrently transferring whether beam recovery is required, regardless of whether PDSCH reception is successful. Method 3 is a method of assigning one HARQ-ACK bit to indicate whether reception of one PDSCH is successful, and assigning additional bits for a beam recovery request, wherein an MSB may be used to determine whether PDSCH reception is successful (ACK or NACK), and in a case of an LSB, 00 may indicate to feed back not to update the TCI state of the first TRP and the second TRP, 01 may indicate feed back to update the TCI state of the first TRP, and 10 may indicate to feed back to update the TCI state of the second TRP. Finally, 11 may indicate to feed back to update the TCIs corresponding to both TRPs, or may indicate a fallback mode for reporting to the base station that a reference beam will be conformed to.

[Method 4] PUCCH Channel Selection Based

Proposed method 4 may be used when each of two TRPs separately transmits the same control channel, the same or different control channels indicate the same PDSCH, and at least one PUCCH resource connected to the corresponding PDSCH exists. As an example, when the terminal is configured with at least four PUCCH resources, indices of the corresponding resources may be 0, 1, 2, 3. Hereinafter, the PUCCH resource indices is converted into a bitmap and described, and the terminal may select the PUCCH resource indices according to the content of the feedback and may transmit feedback information or a predetermined signal.

If the selected PUCCH resource index is "00", whether PDSCH reception is successful indicates NACK, and feedback is provided for the terminal to update TCI states of both TRPs, if the selected PUCCH resource index is "01", the PDSCH indicates ACK and feedback is provided for the terminal to update a TCI state of the first TRP, if the selected PUCCH resource index is "10", the PDSCH indicates ACK and feedback is provided for the terminal to update a TCI state of the second TRP, and if the selected PUCCH resource index is "11", the PDSCH indicates ACK and may indicate no TCI state update is required. Accordingly, whether PDSCH reception is successful is determined by performing an OR operation on the PUCCH resource index bits, and the position of 0 in each bit of the PUCCH resource index may convey whether a TCI update of the TRP is required. The terminal transmits feedback information or a predetermined signal via a resource corresponding to each PUCCH index in four preconfigured PUCCH resources, and the base station determines the feedback information by searching for a resource actually used by the terminal from among four preconfigured resources. Although this example has been described with respect to two TRPs, expansion using the same method is also possible in a case of two or more TRPs.

[Method 5] PUCCH Joint Reception Based

Proposed method 5 may be used when each of two TRPs separately transmits the same control channel, the same or different control channels indicate the same PDSCH, and at least one PUCCH resource connected to the corresponding PDSCH exists. For example, when the terminal is configured with at least four PUCCH resources (and/or PUCCH transmission formats (or PUCCH transmission configurations), a TRP corresponding to PUCCH transmission may be determined according to the PUCCH transmission formats), indices of the resources may be 0, 1, 2, and 3. Hereinafter, a PUCCH resource index (or a resource index according to a PUCCH transmission format) is converted into a bitmap and described, and the terminal may transmit feedback information or a predetermined signal by determining a PUCCH resource index and a TRP to transmit the PUCCH according to the content of the feedback.

If a selected resource index is "00", whether PDSCH reception is successful indicates NACK, and the terminal transmits the PUCCH by repeating same twice to two TRPs, respectively, which refers to that the TCI update of both TRPs is requested. If the selected resource index is "01", the PDSCH indicates ACK, and the terminal transmits NACK to the first TRP and ACK to the second TRP on the PUCCH. The base station which has received this and performs cooperative communication recognizes the PDSCH as ACK, based on PUCCH information received in the first TRP and information received in the second TRP, and updates the TCI state of the first TRP. If the selected resource index is "10", the PDSCH indicates ACK, and the terminal transmits NACK to in the second TRP and ACK to the first TRP on the PUCCH. The base station which has received this and performs cooperative communication recognizes the PDSCH as ACK, based on PUCCH information received in the second TRP and information received in the first TRP, and updates the TCI state of the second TRP. If the selected resource index is "11", the PDSCH indicates ACK, and the terminal transmits ACK to the first TRP and ACK to the second TRP on the PUCCH. The cooperative communication base station which has received this recognizes the PDSCH as ACK, based on PUCCH information received in the first TRP and information received in the second TRP, and updates no TCI state.

[Method 6] PUCCH TRP Selection Based

Proposed method 6 may be used when each of two TRPs separately transmits the same control channel, the same or different control channels indicate the same PDSCH, and at least one PUCCH resource connected to the corresponding PDSCH exists. As an example, when the terminal is configured with at least two PUCCH resources (and/or transmission formats), indices of the corresponding resources may be 0 and 1. Hereinafter, the PUCCH resource indices (e.g., resource indices according to PUCCH transmission formats) are converted into a bitmap and described. If a PUCCH resource index is "0", this indicates a TCI state update request of the first TRP, and the terminal transfers HARQ-ACK information of the PDSCH on the PUCCH, skips PUCCH repetition transmission to the first TRP, and transmits the PUCCH to the second TRP. If the PUCCH resource index is "1", this indicates a TCI state update request of the second TRP, and the terminal transfers HARQ-ACK information of the PDSCH on the PUCCH, skips PUCCH repetition transmission to the second TRP, and transmits the PUCCH to the first TRP. The base station may perform TCI update based on whether the PUCCH is received according to each TRP, and may identify HARQ-ACK information received on the PUCCH.

<Fifth Embodiment> Combination of Respective Embodiments

The disclosure includes independently and selectively applying the methods disclosed in the first to fourth embodiments described above. The disclosure also includes applying one or more combinations of the aforementioned embodiments.

Figure 13:
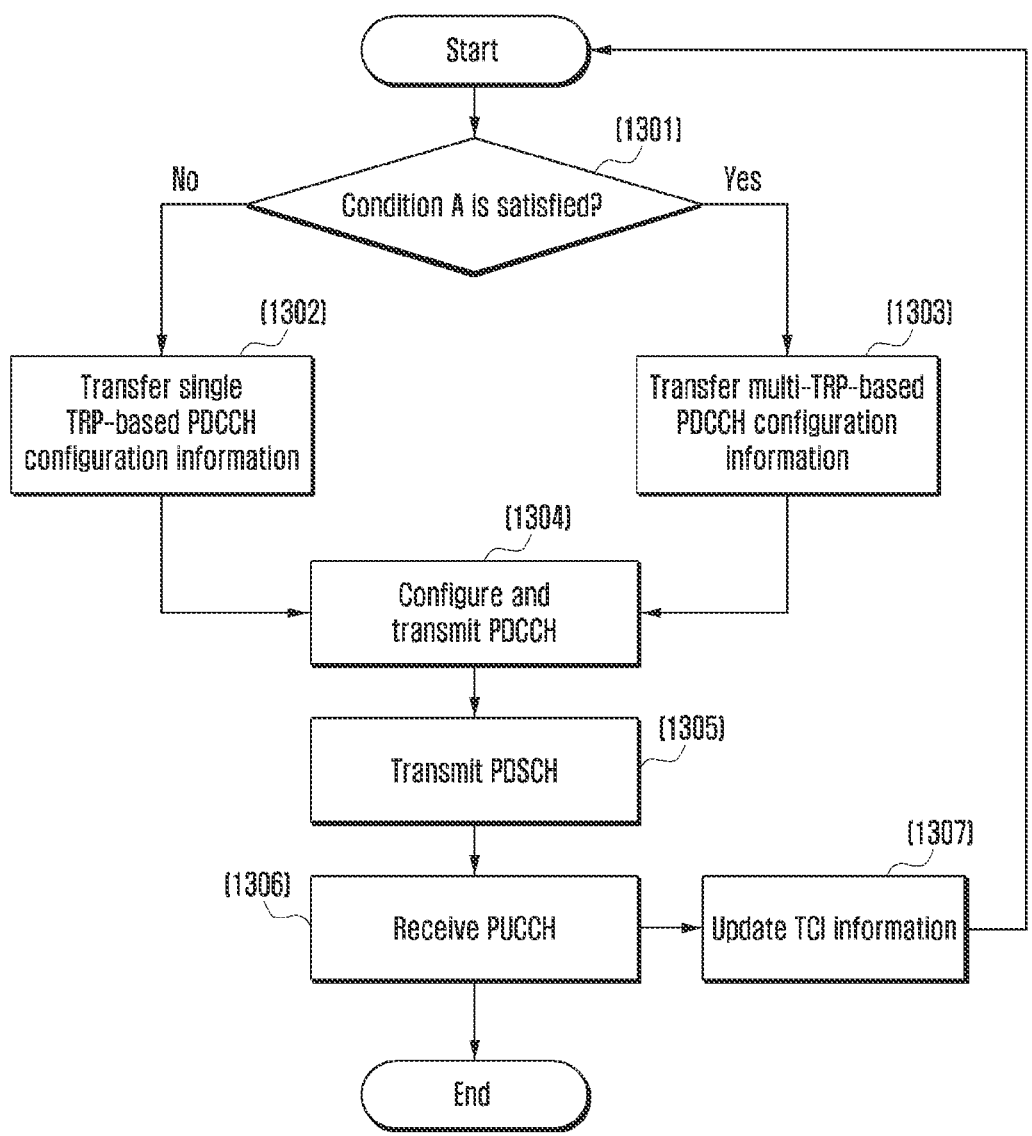
FIG. 13 is a diagram illustrating an operation sequence of a base station, for implementing the disclosure.

FIG. 13 is a diagram illustrating an operation sequence of a base station, for implementing the disclosure. Referring to FIG. 13, a base station determines whether condition A is satisfied, in operation 1301. Condition A includes cases in which multiple TCIs or joint TCIs are configured in one CORESET, one or more SSs are configured in one CORESET, or the same SS is configured in one or more CORESETs. In addition, when the example described in the second embodiment is satisfied, it may be said that condition A is satisfied. If condition A is not satisfied, the base station determines that single TRP-based transmission may be performed, and transmits single TRP-based PDCCH configuration information to a terminal, in operation 1302. Alternatively, if condition A is satisfied, the base station determines that multi TRP-based transmission may be performed, and transmits multi TRP-based PDCCH configuration information to the terminal, in operation 1303. At this time, the multi TRP-based PDCCH configuration information may conform to the first to third embodiments and may include at least one of TCI configuration information, CORESET configuration information, SS configuration information, PDCCH configuration information, PDCCH repetition configuration information, and a MAC CE indicating a TCI, but is not limited thereto. Then, the base station configures a PDCCH and transmits the same to the terminal in operation 1304. In this case, the base station may transmit the same payload (i.e., DCI) from one or more TRPs to the terminal, and the transmission may be based on at least one configured TCI. A specific PDCCH transmission method may conform to the aforementioned first to third embodiments.

Then, the base station may transmit, in operation 1305, a PDSCH scheduled by DCI carried on the PDCCH, and the terminal may identify whether TCI state update is required, based on whether PDSCH reception is successful, whether PDCCH detection is successful based on each TCI, etc. According to the fourth embodiment, the terminal may perform at least one of PUCCH resource or PUCCH transmission format selection and HARQ-ACK bit generation based on whether PDSCH reception is successful and whether a TCI state update is required, so as to transmit the PUCCH to the base station, and the base station may receive the PUCCH in operation 1306. The base station may identify whether PDSCH reception is successful and whether a TCI state update is required, according to at least one of an HARQ-ACK bit received according to a predetermined rule, a PUCCH resource or PUCCH transmission format, in which a signal has been received, a TRP having received the signal, and the like, may update TCI state information when it is fed back that the TCI state update is required, and may indicate the same to the terminal, in operation 1307.

All the respective operations described in FIG. 13 are not necessarily performed, and at least one operation may be omitted or may be performed by changing the order.

Figure 14:
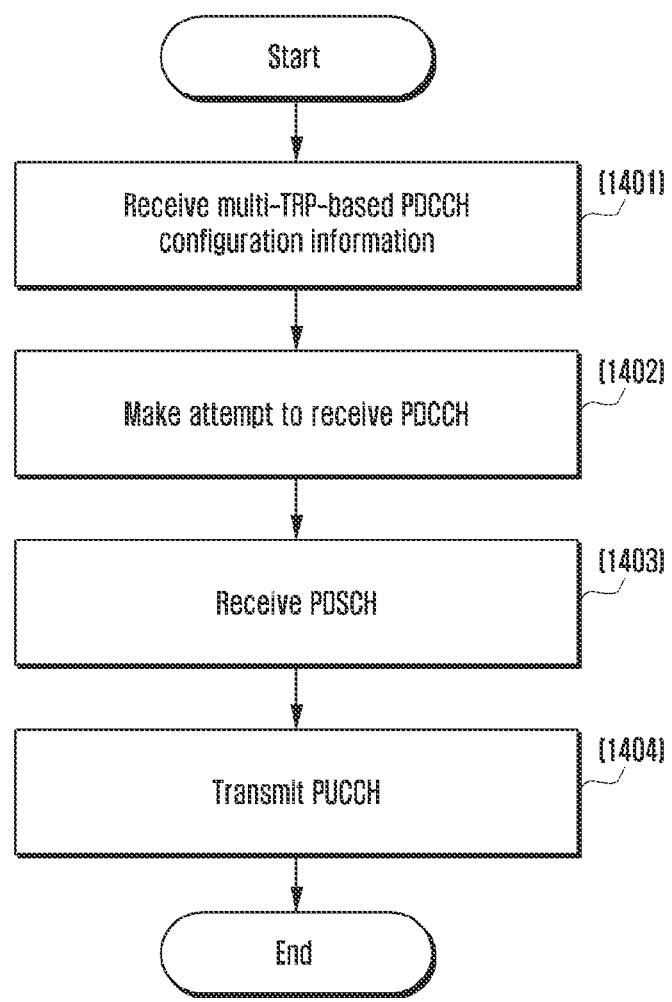
FIG. 14 is a diagram illustrating an operation sequence of a terminal, for implementing the disclosure.

FIG. 14 is a diagram illustrating an operation sequence of a terminal, for implementing the disclosure. Referring to FIG. 14, the terminal receives multi TRP-based PDCCH configuration information from a base station, in operation 1301. At this time, the multi TRP-based PDCCH configuration information may conform to the first to third embodiments and may include at least one of TCI configuration information, CORESET configuration information, SS configuration information, PDCCH configuration information, PDCCH repetition configuration information, and a MAC CE indicating a TCI, but is not limited thereto. Then, the terminal attempts to receive a PDCCH and detects the PDCCH, in operation 1402. In this case, the terminal may receive the same payload (i.e., DCI) from one or more TRPs, and the transmission may be based on at least one configured TCI. A specific PDCCH reception method may conform to the aforementioned first to third embodiments.

Then, the terminal may receive, in operation 1403, a PDSCH scheduled by DCI carried on the PDCCH, and the terminal may identify whether TCI state update is required, based on whether PDSCH reception is successful, whether PDCCH detection is successful based on each TCI, etc. According to the fourth embodiment, the terminal may perform at least one of PUCCH resource or PUCCH transmission format selection and HARQ-ACK bit generation based on whether PDSCH reception is successful and whether a TCI state update is required, so as to transmit the PUCCH to the base station in operation 1404.

All the respective operations described in FIG. 14 are not necessarily performed, and at least one operation may be omitted or may be performed by changing the order.

Figure 15:
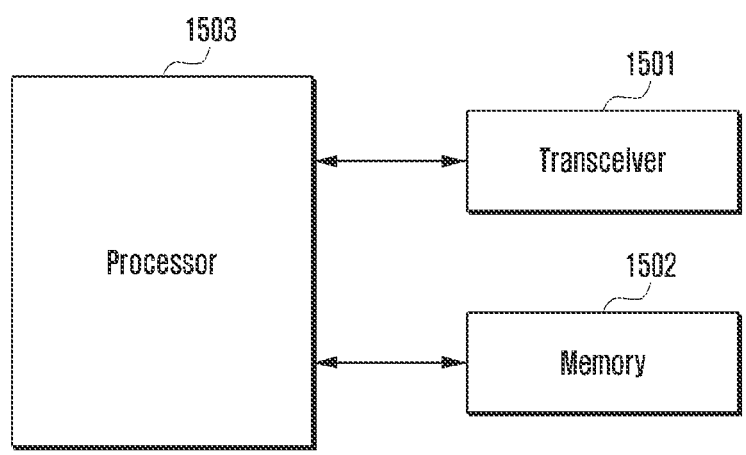
FIG. 15 is a block diagram illustrating a base station device according to the disclosure.
Figure 16:
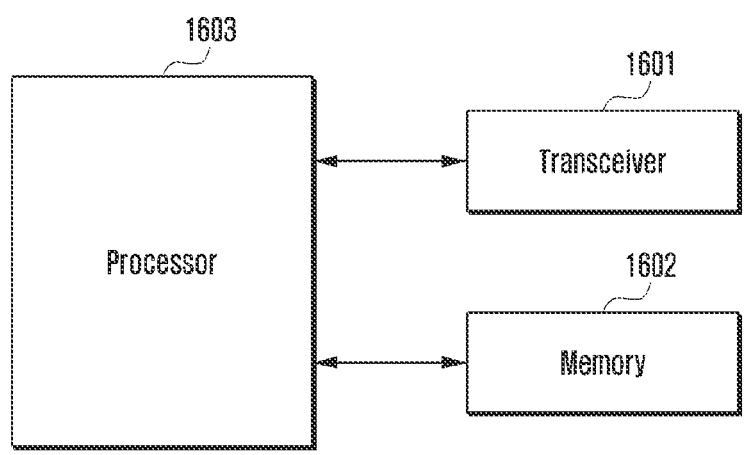
FIG. 16 is a block diagram illustrating a terminal device according to the disclosure.

In order to perform the embodiments of the disclosure, transceivers, memories, and processors of the terminal and the base station are illustrated in FIG. 15 and FIG. 16, respectively. In the aforementioned embodiments, a method for configuring repetition transmission for a PDCCH and methods for transmission and reception by a base station and a terminal for a multi-beam-based transmission and reception technique for a PDCCH are described. In order to perform the methods, each of transceivers, memories, and processors of the base station and the terminal should operate according to the embodiments.

FIG. 15 illustrates a structure of a terminal according to an embodiment of the disclosure.

Referring to FIG. 15, a terminal may include a transceiver 1501, a memory 1502, and a processor 1503. However, the elements of the terminal are not limited to the aforementioned examples. For example, the terminal may include more elements or fewer elements than the aforementioned elements. In addition, the transceiver 1501, the memory 1502, and the processor 1503 may be implemented in the form of a single chip.

According to an embodiment of the disclosure, the transceiver 1501 may transmit a signal to or receive a signal from a base station. The signal may include control information and data. To this end, the transceiver 1501 may include an RF transmitter configured to perform up-conversion and amplification of a frequency of a transmitted signal, an RF receiver configured to perform low-noise amplification of a received signal and perform down-conversion of a frequency, and the like. Further, the transceiver 1501 may receive a signal via a wireless channel, may output the signal to the processor 1503, and may transmit, through the wireless channel, a signal output from the processor 1503.

According to an embodiment of the disclosure, the memory 1502 may store programs and data necessary for operations of the terminal. The memory 1502 may store control information or data included in a signal transmitted or received by the terminal. The memory 1502 may include a storage medium or a combination of storage media, such as a ROM, a RAM, a hard disk, a CD-ROM, and a DVD. Further, the memory 1502 may include multiple memories. According to an embodiment of the disclosure, the memory 1502 may store a program for controlling and receiving PDCCH monitoring of the terminal.

According to an embodiment of the disclosure, the processor 1503 may control a series of procedures so that the terminal may operate according to the aforementioned embodiments of the disclosure. For example, the processor 1503 may control monitoring of a downlink control channel according to embodiments of the disclosure.

Specifically, the processor 1503 may control the transceiver 1501 to receive configuration information for a control channel from a base station, may monitor the control channel from the base station, based on the configuration information for the control channel from the base station, and may control, based on monitoring, each element of the terminal having an operation of detecting the PDCCH.

As a more specific example, the processor 1503 according to an embodiment of the disclosure may control the transceiver 1501 to receive higher layer signaling including information on a control resource set from the base station, and after determining a repetition transmission control channel mode or cooperative communication according to an embodiment of the disclosure, may perform blind decoding on the received control information, based on the determined CORESET and SS configurations.

The processor 1503 may include multiple processors and may perform, by executing a program stored in the memory 1502, a method for controlling and receiving monitoring of a downlink control channel according to embodiments of the disclosure.

FIG. 16 illustrates a structure of a base station according to an embodiment of the disclosure.

Referring to FIG. 16, a base station may include a transceiver 1601, a memory 1602, and a processor 1603. However, the elements of the base station are not limited to the above examples. For example, the terminal may include more elements or fewer elements than the aforementioned elements. In addition, the transceiver 1601, the memory 1602, and the processor 1603 may be implemented in the form of a single chip.

According to an embodiment, the transceiver 1601 may transmit a signal to or receive a signal from a terminal. The signal may include control information and data. To this end, the transceiver 1601 may include an RF transmitter configured to perform up-conversion and amplification of a frequency of a transmitted signal, an RF receiver configured to perform low-noise amplification of a received signal and perform down-conversion of a frequency, and the like. Further, the transceiver 1601 may receive a signal via a wireless channel, may output the signal to the processor 1603, and may transmit, through the wireless channel, a signal output from the processor 1603.

According to an embodiment, the memory 1602 may store programs and data necessary for operations of the base station. The memory 1602 may store control information or data included in a signal transmitted or received by the base station. The memory 1602 may include a storage medium or a combination of storage media, such as a ROM, a RAM, a hard disk, a CD-ROM, and a DVD. Further, the memory 1602 may include multiple memories. According to an embodiment of the disclosure, the memory 1602 may store programs for generating and transmitting a downlink control channel for a terminal and a method of controlling monitoring of the downlink control channel of the terminal.

According to an embodiment of the disclosure, the processor 1603 may control a series of procedures so that the base station may operate according to the aforementioned embodiments of the disclosure. For example, the processor 1603 may control each element of the base station in order to execute a method for controlling monitoring of a downlink control channel by a terminal, and to generate and transmit a downlink control channel.

As a more specific example, the processor 1603 according to an embodiment of the disclosure may transmit, to a terminal, higher layer signaling including information on a control resource set and may control the transceiver 1601 to transmit control information for the terminal, based on the higher layer signaling.

The processor 1603 may include multiple processors and may perform, by executing programs stored in the memory 1602, a method of controlling monitoring of a downlink control channel by a terminal and a method for generating and transmitting a downlink control channel according to embodiments of the disclosure.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Further, the above respective embodiments may be employed in combination, as necessary. For example, a part of one embodiment of the disclosure may be combined with a part of another embodiment to operate a base station and a terminal. Further, the embodiments of the disclosure may be applied to other communication systems, and other variants based on the technical idea of the embodiments may also be implemented. For example, the embodiments may be applied to LTE, 5G, NR, or other systems.

The invention claimed is:

1. A method of a base station in a communication system, the method comprising:
transmitting, to a terminal, control channel configuration information comprising multiple pieces of transmission configuration indicator (TCI) information and search space (SS) configuration information, wherein the SS configuration information includes information on a first offset for first TCI information and information on a second offset for second TCI information; and
transmitting, to the terminal, a plurality of physical downlink control channels (PDCCHs) according to multiple TCIs,
wherein the terminal decodes different PDCCHs having a same payload by applying the multiple TCIs, and combines the different PDCCHs having the same payload at a bit level, a symbol level, or a Log-Likelihood Ratio (LLR) level,
wherein the control channel configuration information comprises multiple control resource set (CORESET) configurations and one search space (SS) configuration associated with the multiple CORESET configurations, and
wherein in case that multiple CORESETs are partially overlapped or fully overlapped, single frequency network (SFN) transmission for multiple TCI information is used for transmitting the downlink control information.

2. The method of claim 1, wherein each piece of TCI information comprises an uplink TCI and a downlink TCI, the uplink TCI indicates beam-related information used when the terminal receives a signal, and the downlink TCI indicates beam-related information used when the base station transmits a signal.

3. The method of claim 1, wherein the control channel configuration information further comprises multiple control resource set (CORESET) configurations and one search space (SS) configuration connected to the multiple CORESET configurations,
wherein the multiple downlink control channels are mapped to respective multiple resources identified based on the multiple CORESET configurations, and
wherein the multiple TCIs correspond to the multiple downlink control channels, respectively.

4. A method of a terminal in a communication system, the method comprising:
receiving, from a base station, control channel configuration information comprising multiple pieces of transmission configuration indicator (TCI) information and search space (SS) configuration information, wherein the SS configuration information includes information on a first offset for first TCI information and information on a second offset for second TCI information;
receiving, from the base station, a plurality of physical downlink control channels (PDCCHs) based on multiple TCIs;
decoding different PDCCHs having a same payload by applying the multiple TCIs; and
combining the different PDCCHs having the same payload at a bit level, a symbol level, or a Log-Likelihood Ratio (LLR) level,
wherein the control channel configuration information comprises multiple control resource set (CORESET) configurations and one search space (SS) configuration associated with the multiple CORESET configurations, and
wherein in case that multiple CORESETs are partially overlapped or fully overlapped, single frequency network (SFN) transmission for multiple TCI information is used for receiving the downlink control information.

5. The method of claim 4, wherein each piece of TCI information comprises an uplink TCI and a downlink TCI, the uplink TCI indicates beam-related information used when the terminal receives a signal, and the downlink TCI indicates beam-related information used when the base station transmits a signal.

6. The method of claim 4, wherein the control channel configuration information further comprises multiple control resource set (CORESET) configurations and one search space (SS) configuration connected to the multiple CORESET configurations,
wherein the multiple downlink control channels are mapped to respective multiple resources identified based on the multiple CORESET configurations, and
wherein the multiple TCIs correspond to the multiple downlink control channels, respectively.

7. A base station of a communication system, the base station comprising:
a transceiver; and
a controller connected to the transceiver and configured to:
transmit, to a terminal, control channel configuration information comprising multiple pieces of transmission configuration indicator (TCI) information and search space (SS) configuration information, wherein the SS configuration information includes information on a first offset for first TCI information and information on a second offset for second TCI information,
transmit, to the terminal, a plurality of physical downlink control channels (PDCCHs) according to multiple TCIs,
wherein the terminal decodes different PDCCHs having a same payload by applying the multiple TCIs, and combines the different PDCCHs having the same payload at a bit level, a symbol level, or a Log-Likelihood Ratio (LLR) level,
wherein the control channel configuration information comprises multiple control resource set (CORESET) configurations and one search space (SS) configuration associated with the multiple CORESET configurations, and
wherein in case that multiple CORESETs are partially overlapped or fully overlapped, single frequency network (SFN) transmission for multiple TCI information is used for transmitting the downlink control information.

8. The method of claim 7, wherein each piece of TCI information comprises an uplink TCI and a downlink TCI, the uplink TCI indicates beam-related information used when the terminal receives a signal, and the downlink TCI indicates beam-related information used when the base station transmits a signal.

9. The base station of claim 7, wherein the control channel configuration information further comprises multiple control resource set (CORESET) configurations and one search space (SS) configuration connected to the multiple CORESET configurations,
wherein the multiple downlink control channels are mapped to respective multiple resources identified based on the multiple CORESET configurations, and
wherein the multiple TCIs correspond to the multiple downlink control channels, respectively.

10. A terminal of a communication system, the terminal comprising:
a transceiver; and
a controller connected to the transceiver and configured to:
receive, from a base station, control channel configuration information comprising multiple pieces of transmission configuration indicator (TCI) information and search space (SS) configuration information, wherein the SS configuration information includes information on a first offset for first TCI information and information on a second offset for second TCI information,
receive, from the base station, a plurality of physical downlink control channels (PDCCHs) based on multiple TCIs,
decode different PDCCHs having a same payload by applying the multiple TCIs, and
combine the different PDCCHs having the same payload at a bit level, a symbol level, or a Log-Likelihood Ratio (LLR) level,
wherein the control channel configuration information comprises multiple control resource set (CORESET)

configurations and one search space (SS) configuration associated with the multiple CORESET configurations, and wherein in case that multiple CORESETs are partially overlapped or fully overlapped, single frequency network (SFN) transmission for multiple TCI information is used for receiving the downlink control information.

11. The terminal of claim 10, wherein each piece of TCI information comprises an uplink TCI and a downlink TCI, the uplink TCI indicates beam-related information used when the terminal receives a signal, and the downlink TCI indicates beam-related information used when the base station transmits a signal.

12. The terminal of claim 10, wherein the control channel configuration information further comprises one control resource set (CORESET) configuration and one search space (SS) configuration connected to the CORESET configuration, wherein the multiple downlink control channels are mapped to respective multiple resources identified based on the SS configuration, and wherein the multiple TCIs correspond to the multiple downlink control channels, respectively.

* * * * *